(12) United States Patent
Sullivan et al.

(10) Patent No.: US 10,861,031 B2
(45) Date of Patent: Dec. 8, 2020

(54) METHODS AND APPARATUS TO FACILITATE DYNAMIC CLASSIFICATION FOR MARKET RESEARCH

(71) Applicant: The Nielsen Company (US), LLC, New York, NY (US)

(72) Inventors: Jonathan Sullivan, Hurricane, UT (US); Michael Sheppard, Brooklyn, NY (US); Peter Lipa, Tucson, AZ (US); Alejandro Terrazas, Santa Cruz, CA (US); John Charles Torres, San Diego, CA (US)

(73) Assignee: The Nielsen Company (US), LLC, New York, NY (US)

( * ) Notice: Subject to any disclaimer, the term of this patent is extended or adjusted under 35 U.S.C. 154(b) by 1115 days.

(21) Appl. No.: 14/951,944

(22) Filed: Nov. 25, 2015

(65) Prior Publication Data
US 2017/0148042 A1    May 25, 2017

(51) Int. Cl.
*G06Q 30/02* (2012.01)
*G06N 5/04* (2006.01)
*G06N 20/00* (2019.01)
*G06N 3/08* (2006.01)

(52) U.S. Cl.
CPC ......... *G06Q 30/0204* (2013.01); *G06N 3/088* (2013.01); *G06N 5/048* (2013.01); *G06N 20/00* (2019.01)

(58) Field of Classification Search
CPC ... G06Q 30/0204; G06N 5/048; G06N 99/005
See application file for complete search history.

(56) References Cited

U.S. PATENT DOCUMENTS

| | | |
|---|---|---|
| 6,684,194 B1 | 1/2004 | Eldering et al. |
| 7,519,860 B2 | 4/2009 | Hatonen et al. |
| 7,558,773 B2 | 7/2009 | Mancisidor et al. |

(Continued)

OTHER PUBLICATIONS

Rauber, et al., "The Growing Hierarchical Self-Orgainzing Map: Exploratory Analysis of High-Dimensional Data", IEEE Transactions on Neural Networks, vol. 13, No. 6, Nov. 2002 (Year: 2002).*

(Continued)

*Primary Examiner* — Robert A Cassity
*Assistant Examiner* — Tsu-Chang Lee
(74) *Attorney, Agent, or Firm* — Hanley, Flight and Zimmerman, LLC

(57) ABSTRACT

Methods and apparatus to facilitate dynamic classification for market research are disclosed. Example disclosed methods include constructing, using a programmed processor based on data for a sample population and a first set of input variables, a self-organizing map classifying the sample population according to a plurality of classes defined in the map using fuzzy class membership. Example disclosed methods include extracting the fuzzy class membership for the sample population from the map. Example disclosed methods include correlating fuzzy class membership with behavior data for the sample population to determine a likely class behavior for the plurality of classes. Example disclosed methods include using fuzzy class membership and the likely class behavior to provide a predictive market output in response to a query.

25 Claims, 17 Drawing Sheets

(56) References Cited

U.S. PATENT DOCUMENTS

| | | | |
|---|---|---|---|
| 7,657,907 | B2 | 2/2010 | Fennan et al. |
| 7,877,346 | B2 | 1/2011 | Karty |
| 7,941,535 | B2 | 5/2011 | Sherrets et al. |
| 8,073,866 | B2 | 12/2011 | Eagle et al. |
| 8,140,391 | B2 | 3/2012 | Jacobi et al. |
| 9,639,746 | B2 * | 5/2017 | Bulzacki .............. G06K 9/6201 |
| 2003/0212619 | A1 | 11/2003 | Jain et al. |
| 2004/0073918 | A1 | 4/2004 | Ferman et al. |
| 2008/0033810 | A1 | 2/2008 | Chu |
| 2008/0306895 | A1 | 12/2008 | Karty |
| 2010/0131433 | A1 | 5/2010 | Sanchez Garcia et al. |
| 2014/0201126 | A1 * | 7/2014 | Zadeh .................... G06K 9/627 706/52 |

OTHER PUBLICATIONS

Kaufmann, et al., "AnInductive Fuzzy Classification Approach applied to Individual Marketing", The 28th North American Fuzzy Information Processing Sociery Annual Conference (NAFIPS2009), Cincinnati, Ohio, USA, Jun. 14-17, 2009 (Year: 2009).*

Meier et al., "A Fuzzy Classification Model for Online Customers", University of Fribourg, Switzerland, Mar. 1, 2007, 8 pages.

Sohn et al., "Advantages of Using Class Memberships in Self-Organizing Map and Support Vector Machines", retrieved from http://www.docstoc.com/docs/122065156/Self-Organizing-Map-with-Fuzzy-Class-Memberships, on Jun. 4, 2015, 37 pages.

Sohn et al., "Advantages of Using Class Memberships in Self-Organizing Map and Support Vector Machines", Smart Engineering Systems Laboratory, Department of Engineering Management, University of Missouri—Rolla, on Jan. 1, 2001, 6 pages.

Lin et al., "A Self-organized Semantic Map for Information Retrieval", University of Maryland, 1991, 8 pages.

Zimmerman, "Fuzzy set applications in Pattern Recognition and Data-Analysis", 11th IAPR International Conference on Pattern Recognition, Aug. 29, 1992, 80 pages.

* cited by examiner

METHODS AND APPARATUS TO FACILITATE DYNAMIC CLASSIFICATION FOR MARKET RESEARCH

FIELD OF THE DISCLOSURE

This disclosure relates generally to market research, and, more particularly, to methods and apparatus to facilitate dynamic classification for market research.

BACKGROUND

For marketing purposes, knowledge of customer behavior is important. For direct marketing, for example, it is desirable to focus the marketing on a segment of the population likely to purchase a marketed product or service.

Traditionally, a customer population has been divided into segments. Segmentation can be used to predict consumer behavior and classify consumers into clusters based on observable characteristics. Factors used to segment the population into clusters include demographic data such as age, marital status, and income. Other factors include behavioral data such as a tendency to purchase a particular product or service. Marketers may use demographic, geographic, and behavioral information to analyze different demographic components to predict demand for future products and services, for example.

DETAILED DESCRIPTION

Figure 1:
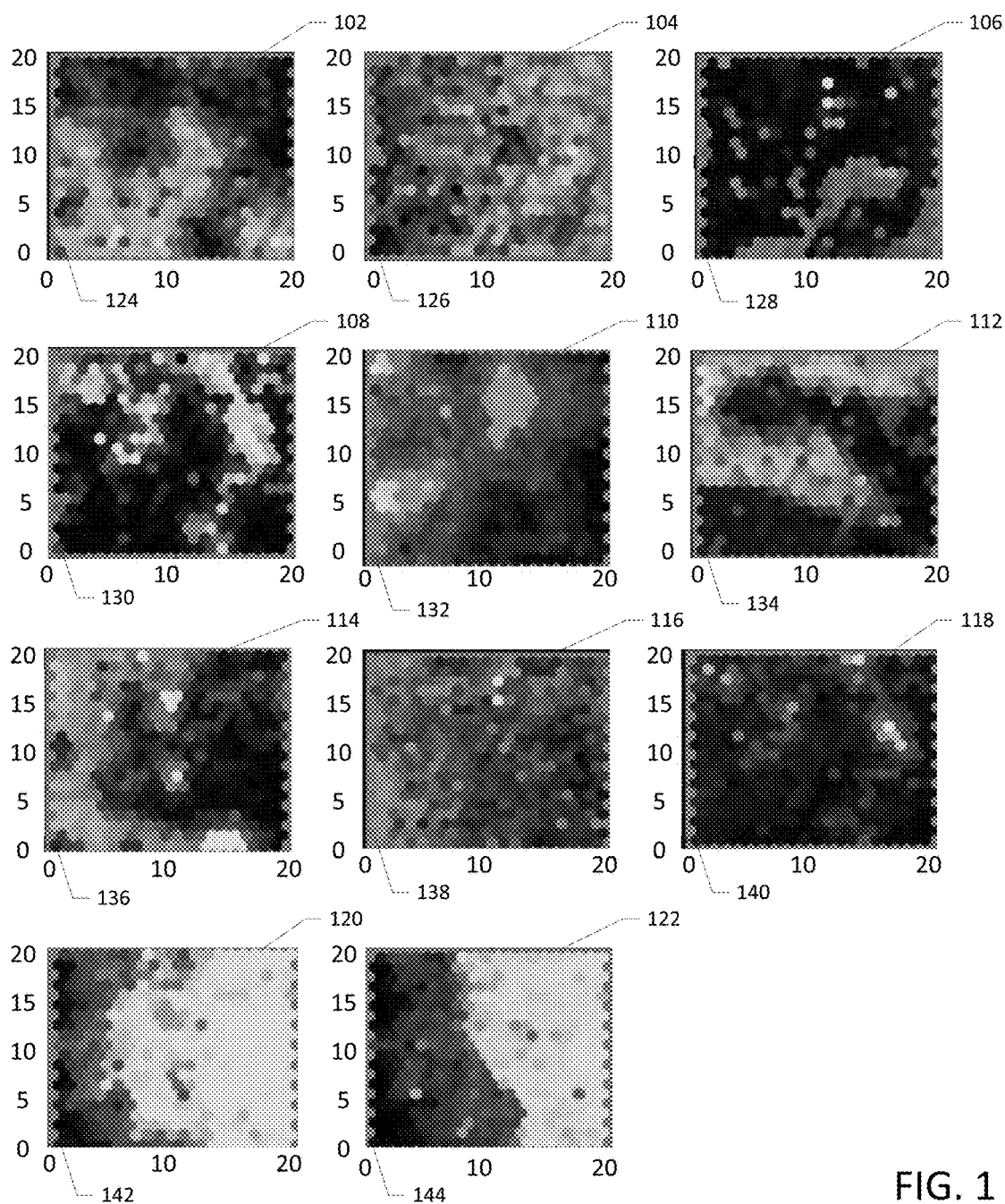
FIG. 1 shows example probabilistic self-organizing maps (SOMs) classifying variable weights according to example inputs.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Identifying, classifying, and predicting consumer behavior is important for targeted marketing of products and services. Targeted marketing saves resources and improves an impact and likelihood of success for marketing and promotional efforts such as coupons, cross-promotional offers, marketing suggestions and/or product development research, for example. Predicting which segment of a population is likely to purchase a marketed product or service is valuable for marketers and manufacturers.

Segmentation is a marketing strategy that involves dividing a broad target market into subsets of consumers, businesses, or countries which have, or are perceived to have, common needs, interests, and priorities, and then designing and implementing strategies to target them. Market segmentation strategies can be used to identify and further define a group of target customers, for example. Market segmentation strategies can also be used to help businesses develop product differentiation strategies (e.g., involving specific products and/or product lines) depending on specific demand and/or attributes associated with a target segment.

For example, PRIZM is a set of geo-demographic segments for population in the United States. The PRIZM set of segments, provided by The Nielsen Company (US), LLC, can be used as a customer segmentation system for marketing in the United States. The original PRIZM model includes 62 segments. The segments of PRIZM were developed, in part, by analysis of U.S. census data. PRIZM NE (New Evolution) is an update to the original PRIZM model and categorizes U.S. consumers into 14 distinct groups and 66 demographically and behaviorally distinct types, or "segments," to help marketers discern consumers likes, dislikes, lifestyles, and purchase behaviors. For example, a PRIZM NE segment referred to as "The Cosmopolitans" is defined to include immigrants and descendants of multi-cultural backgrounds in multi-racial, multi-lingual neighborhoods.

An example segmentation list (e.g., PRIZM NE) includes 01—Upper Crust; 02—Blue Blood Estates; 03—Movers & Shakers; 04—Young Digerati; 05—Country Squires; 06—Winner's Circle; 07—Money & Brains; 08—Executive Suites; 09—Big Fish, Small Pond; 10—Second City Elite; 11—God's Country; 12—Brite Lites, Li'l City; 13—Upward Bound; 14—New Empty Nests; 15—Pools & Patios; 16—Bohemian Mix; 17—Beltway Boomers; 18—Kids & Cul-de-Sacs; 19—Home Sweet Home; 20—Fast-Track Families; 21—Gray Power; 22—Young Influentials; 23—Greenbelt Sports; 24—Up-and-Comers; 25—Country Casuals; 26—The Cosmopolitans; 27—Middleburg Managers; 28—Traditional Times; 29—American Dreams; 30—Suburban Sprawl; 31—Urban Achievers; 32—New Homesteaders; 33—Big Sky Families; 34—White Picket Fences; 35—Boomtown Singles; 36—Blue-Chip Blues; 37—Mayberry-ville; 38—Simple Pleasures; 39—Domestic Duos; 40—Close-In Couples; 41—Sunset City Blues; 42—Red, White & Blues; 43—Heartlanders; 44—New Beginnings; 45—Blue Highways; 46—Old Glories; 47—City Startups; 48—Young & Rustic; 49—American Classics; 50—Kid Country, USA; 51—Shotguns & Pickups; 52—Suburban Pioneers; 53—Mobility Blues; 54—Multi-Culti Mosaic; 55—Golden Ponds; 56—Crossroads Villagers; 57—Old Milltowns; 58—Back Country Folks; 59—Urban Elders; 60—Park Bench Seniors; 61—City Roots; 62—Hometown Retired; 63—Family Thrifts; 64—Bedrock America; 65—Big City Blues; and 66—Low-Rise Living.

Many businesses (e.g., manufacturers, retailers, etc.) and advertisers try to increase demand for their goods or services by influencing the behavior of target consumer segments through advertising campaigns. Often, businesses will try to improve their marketing efforts by targeting specific consumer segments. However, identifying such segments can be difficult. Segmentation solutions often lack breadth based on a lack of sufficient information, giving rise to unsubstantiated generalizations about consumers.

For example, consumer segments are frequently defined by demographic, behavioral, and/or attitudinal characteristics obtained from consumer panelists participating in a marketing research study conducted by a marketing research entity (e.g., The Nielsen Company (US), LLC). In such examples, the demographic characteristics of the panelists can be collected when consumers enroll as panelists. Further, once consumers become panelists, their purchasing behavior (e.g., what products they buy, in what quantity, at what price, etc.) can be tracked and recorded at relatively little expense.

In prior approaches, however, a panelist and/or other consumer is assigned to only one particular segment or group. Such an assumption that a person fits only one category is simplistic and inaccurate. Instead, certain examples distinguish between a probability that a person is in a particular segment and fuzzy logic indicating how much a person is in a particular segment (e.g., how often (e.g., what percentage of the time) the person fits the behavior and/or other criterion for a particular segment or group).

Data describing and/or associated with a population of interest (e.g., a population of potential interest for marketing of a new product and/or service, etc.) can be segmented or clustered into groups having similar structure based on categories of ordinal data (e.g., demographic information, financial information, behavior, preference, etc.), for example. Decision trees and clustering can be determined as a mutually exclusive decision (e.g., a person is either in one cluster or another cluster). However, such decision-tree based clustering is too restrictive. Using probabilities, a person may have a certain likelihood of being in a particular cluster. However, such probability may also be too restrictive when analyzing actual people for patterns and tendencies.

Fuzzy logic and probability theory address different forms of uncertainty. While both fuzzy logic and probability theory can represent degrees of certain kinds of subjective belief, fuzzy set theory uses the concept of fuzzy set membership, and probability theory uses the concept of subjective probability. Fuzzy set membership characterizes how much a variable is in a set, while subjective probability specifies how probable is it that a variable is in a set. With subjective probability, a value (e.g., a person) either entirely is or entirely is not in the set, but there is uncertainty around whether it is or is not in the set. Thus, using probability, a person is in one segment or cluster, and the probability indicates that the person is probabilistically all in one cluster/segment versus other clusters/segments.

Fuzzy logic is a form of many-valued logic in which a true value of a variable may be any real number between 0 and 1. In contrast, with Boolean logic, the true value of a variable may only be 0 or 1. Fuzzy logic can also accommodate the concept of partial truth, where the truth value for a variable may range between completely true and completely false. For example, when evaluating whether a panelist is a member of class A or class B, Boolean logic dictates a determination that the panelist is a member of class A and not a member of class B. Using fuzzy logic, however, the panelist can be determined to be 80% a member of class A and 20% a member of class B. Thus, the panelist may mostly correspond to class A but also partially correspond to class B (e.g., most of the time, the panelist matches the behavior of people in class A, but some of the time his or her behavior matches the behavior of people in class B). A neural network can be used to identify and implement such fuzzy logic, for example.

In certain examples, one or more neural networks are used to construct an n-dimensional self-organizing map which uses fuzzy logic to assign a fuzzy scale of each person belonging to each cluster or class from an available plurality of clusters/classes. For example, a neural network is used to construct a two-dimensional self-organizing map which assigns a fuzzy scale for each person belonging to each of the available clusters or classes. A weighted value assigned to a node in the map indicates a fuzzy scale or weight for that person or group of similar people in the map.

Methods and apparatus to cluster data into similar groups for market research are disclosed. Example disclosed methods include constructing, using a programmed processor based on data for a sample population and a first set of input variables, a self-organizing map classifying the sample population according to a plurality of classes defined in the map using fuzzy class membership. Example disclosed methods include extracting the fuzzy class membership for the sample population from the map. Example disclosed methods include correlating fuzzy class membership with behavior data for the sample population to determine a likely class behavior for the plurality of classes. Example disclosed methods include using fuzzy class membership and the likely class behavior to provide a predictive market output in response to a query.

Example disclosed tangible computer readable storage media have instruction that, when executed, cause a machine to construct, based on data for a sample population and a first set of input variables, a self-organizing map classifying the sample population according to a plurality of classes defined in the map using fuzzy class membership. Example disclosed tangible computer readable storage media have instruction that, when executed, cause a machine to extract the fuzzy class membership for the sample population from the map. Example disclosed tangible computer readable storage media have instruction that, when executed, cause a machine to correlate fuzzy class membership with behavior data for the sample population to determine a likely class behavior for the plurality of classes. Example disclosed tangible computer readable storage media have instruction that, when executed, cause a machine to use fuzzy class membership and the likely class behavior to provide a predictive market output in response to a query.

Example disclosed apparatus include a market behavior data processor particularly programmed to construct, based on data for a sample population and a first set of input variables, a self-organizing map classifying the sample population according to a plurality of classes defined in the map using fuzzy class membership. Example disclosed apparatus include a market behavior data processor particularly programmed to extract the fuzzy class membership for the sample population from the map. Example disclosed apparatus include a market behavior data processor particularly programmed to correlate fuzzy class membership with behavior data for the sample population to determine a likely class behavior for the plurality of classes. Example disclosed apparatus include a market behavior data processor particularly programmed to use fuzzy class membership and the likely class behavior to provide a predictive market output in response to a query.

Self-Organizing Map Examples

A self-organizing map (SOM), also referred to as a self-organizing feature map (SOFM), is a type of artificial neural network that is trained using unsupervised learning to produce a low-dimensional (e.g., two-dimensional), discretized representation of an input space of training samples. The representation is referred to as a map. SOMs are different from other artificial neural networks at least because SOMs employ a neighborhood function to preserve topological properties of the input space. As will be described further below, using fuzzy logic, for example, a fuzzy scale or score can be preserved in the map to indicate "how much" an input person is "in" that map.

A SOM, also referred to as a Kohonen map or Kohonen network (after the creator of the map type—Teuvo Kohonen), is useful to represent a large amount of multi-dimensional data in lower dimensions (e.g., one- or two-dimensional maps). The SOM differs from other artificial neural networks at least because the map applies competitive learning rather than error-correction learning to weight and build the components, referred to as neurons or nodes, of the map. Competitive learning is an unsupervised learning that can be executed automatically by the SOM neural network. The SOM operates in a training mode to build a map using unsupervised competitive learning. In a competitive learning algorithm, all neurons/nodes of the map are the same, but weights associated with the input are distributed among the neurons which cause them to respond differently to different inputs. Neurons "compete" among each other to see which neuron is most similar to a particular input. Thus, the neurons automatically organize themselves to be weighted based on which node corresponds most closely or identifies most closely with a given input variable.

In an SOM, neurons can initially be weighted at a certain value, and weights are adjusted as neuron values are evaluated and compared to other neurons. From a given pool of neuron weights, neuron values that are weaker or lesser for a particular variable lose weight, which is then given to neurons having values that are stronger/greater for that particular variable, for example. Over time, neurons or clusters associated with certain panelists are activated more strongly for certain input variables and more weakly for other input variables to develop a profile for that cluster across the plurality of SOMs (and, by association, across the input variables associated with the SOMs).

Thus, weights may initially be randomly assigned to nodes, and weights will be re-distributed over multiple iterations into a map of stable nodes to provide a feature map of a space for the input variable. After a best matching node is identified for the particular input variable, the remaining nodes are weighted with respect to that best matching node (e.g., the panelist that is "strongest" with respect to that particular input variable).

In a SOM, input vector dimensionality can be reduced to a two-dimensional map representation while maintaining topological relationships between the data. Data vectors may be normalized into unit vectors (e.g., vectors of length one) before being applied to train an SOM, for example. After an SOM or group of SOMs has been trained, the SOMs can then be used in a mapping mode to classify a new input vector. Weights can be represented using coloration, pattern, etc., for each node in the map. In addition to use via the SOM, colorized/patterned nodes can be utilized in other visualization as well. For example, panelist income mapping can be combined with geographic location to generate a geographic map of panelist location colored according to panelist income.

FIG. 1 shows example probabilistic SOMs classifying variable weights according to example inputs. In the example of FIG. 1, panelist or respondent data corresponding to eleven input variables or categories are mapped according to the SOMs to group the panelists. For example, the 11 input variables in the example of FIG. 1 include age, sex, marital status, number of children, income, credit level, number of dependents, education, household size, retirement savings, and net worth. Applying each of the 11 inputs as training variables in an input vector for 200,000 respondents yields maps 102-122 grouping the 200,000 respondents into 400 clusters or class represented by nodes in the map 102-122. As shown in the example of FIG. 1, each map 102-122 is organized according to an x,y coordinate system such that the nodes can be referenced by coordinate (e.g., node (0,0), etc.). In the example of FIG. 1, node placement is consistent between the plurality of maps 102-122 such that node (0,0) 124-144 represents the same cluster or class in each map 102-122. Each node 124-144, as depicted in the respective map 102-122 is represented using a color, pattern, shading, etc., to illustrate a weight that each of the 11 inputs factors into a "typical" or representative person in each of the 400 clusters/classes that have been determined by the respective map 102-122.

Maps 102-122 shown in FIG. 1 show a weight plane for each element of the input vector (e.g., an analysis of the 11 inputs in the example input vector of FIG. 1 generate 11 corresponding maps with weighted nodes for each variable (e.g., 11 weight planes): a weight plane for age in the clusters 102, a weight plane for sex in the clusters 104, a weight plane for marital status in the clusters 106, a weight plane for number of children 108, a weight plane for income 110, a weight plane for credit level 112, a weight plane for number of dependents 114, a weight plane for education 116, a weight plane for household size 118, a weight plane for retirement savings 120, and a weight plane for net worth 122). The maps 102-122 are visualizations of the weights that connect each input to each node or neuron in each map 102-122. A particular node 124-144 represents the same cluster across each of the multiple inputs in the input vector. As will be described further below, the map 102-122 forms the cluster from a plurality of respondents providing input data. A color, shading, and/or other emphasis of a node conveys a magnitude or extent of the weight of the input factor with respect to the associated cluster. For example, darker colors represent larger weights for a particular input variable (e.g., higher income, more children, etc.), while lighter colors represent smaller weights (e.g., lower income, fewer children, etc.) when clusters of respondents are compared to form nodes in the map.

If connection patterns of two inputs 102-122 are similar, the inputs are assumed to be highly correlated. As shown in the example of FIG. 1, input 11 (net worth) 122 has connections that are different from connections of input 3 (marital status) 106 but the connections of input 11 (net worth) 122 are more similar to connections of input 10 (retirement savings) 120. Two clusters or classes exhibiting similar input patterns can be identified and further correlated via the SOMs 102-122 when answering client market questions, for example.

Thus, in the example of FIG. 1, a "typical" person from cluster (0,0) is middle aged 124, male 126, married 128, with some kids 130, classified as middle income 132, having good credit 134, has dependents 136, is somewhat educated (e.g., some college) 138, has a larger household size 140, saved a fair amount for retirement 142, and has a high net worth 144.

As shown in the example of FIG. 1, responses to a plurality of questions and/or criteria (e.g., responses by 200,000 panelists to 11 ordinal categories or questions) can be provided as ordinal inputs to an SOM for automated evaluation and weighting via the SOM. In the example of FIG. 1, respondents are grouped by the SOM based on answer, respondent characteristic(s), etc. to provide a smaller number of groups or clusters for evaluation.

For example, as shown in the example of FIG. 1, 200,000 panelists can be grouped into 400 groups to form a 20 by 20 topological map 102-122. A SOM 102-122 calculates which group or cluster each panelist is to be associated with. Neurons in the SOM neural network receive inputs. For example, a layer of the SOM receives 11 input variables from the 200,000 respondents and applies a logic function to the respondent input information with varying weight. An output of the logic function (described in more detail below) is fed into a two-dimensional 20×20 array of neurons (nodes), and the logic function is applied iteratively to maximize or increase inter-cluster variance while minimizing or reducing intra-cluster variance. Once the iterative logic processing has stabilized to provide a consistent output, the resulting output response is a probability of class/cluster membership for each panelist.

After the maps have been trained to classify the panelists with fuzzy classification, the SOMs can be used to answer a client question. Subsets of similar groups can be identified from the SOMs to answer a client question, for example. For example, Groups 1, 3, 5, 10, and 200 out of 400 might be interested in a certain brand of soap, while Groups 300, 302, and 317 are a target audience for a luxury sports car.

Thus, each panelist has fuzzy-set membership in each available group (e.g., each of the 400 groups in the example of FIG. 1). However, rather than fuzzy-set membership for a panelist being an equal 1/400 in each of the 400 possible clusters or classes, fuzzy-set membership varies based on the input/observation. Fuzzy-set membership can be verified by comparing a training set of observations (inputs) to a test set of observations applied to a trained SOM. In an example, tracking a fuzzy probability for an observation (e.g., a person's behavior) across three groups yields a [10%, 70%, 20%] probability of group membership for the input across available Groups 1, 2 and 3 (e.g., Group 1 is 10% "in" the input, Group 2 is 70% in the input, and Group 3 is 20% in the input). Thus, the observation is most likely a member of Group 2, and the maximum (fuzzy) probability across the groups is 70%.

Figure 2:
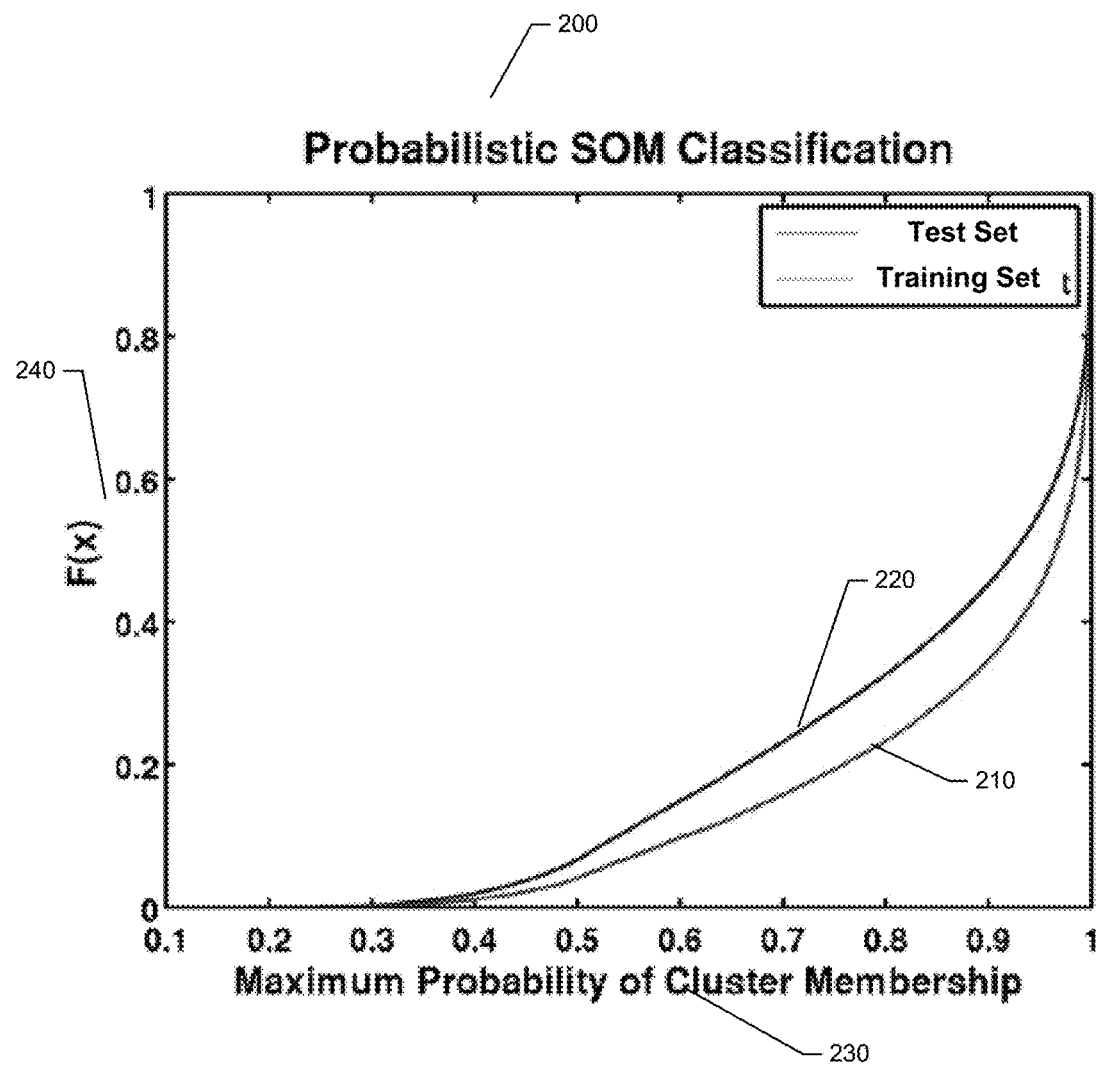
FIG. 2 illustrates an example SOM classification comparing a training set of inputs and a test set of inputs.

FIG. 2 illustrates an example SOM classification 200 comparing a training set of inputs 210 and a test set of inputs 220. As illustrated in the graph 200, the training set 210 and the test set 220 can be analyzed to determine a maximum probability of class membership 230 for each person in the set 210, 220. The x-axis of the example plot 200 provides the maximum probability of class membership 230, and the y-axis is a percentage of people having that maximum probability of being in a particular class (e.g., a cumulative distribution function $F(x)$). The training set in the example plotted in FIG. 2 has a cumulative distribution of fuzzy probability 210, and the test set has a cumulative distribution of fuzzy probability 220. As shown in the example of FIG. 2, 50% of observations in the training set 210 have a maximum fuzzy-probability of 95% or less, and only about 5%-10% of the observations in the training set 210 have a maximum fuzzy-probability that did not exceed a 50% threshold. The test set distribution 220 exhibits similar behavior. Thus, the approaches disclosed and described herein are validated because most panelists are unevenly distributed in multiple classes with one dominant or primary class, rather than belonging exclusively to one class at all times.

Example Market Behavior Data Mapping and Analytics Systems

Figure 3:
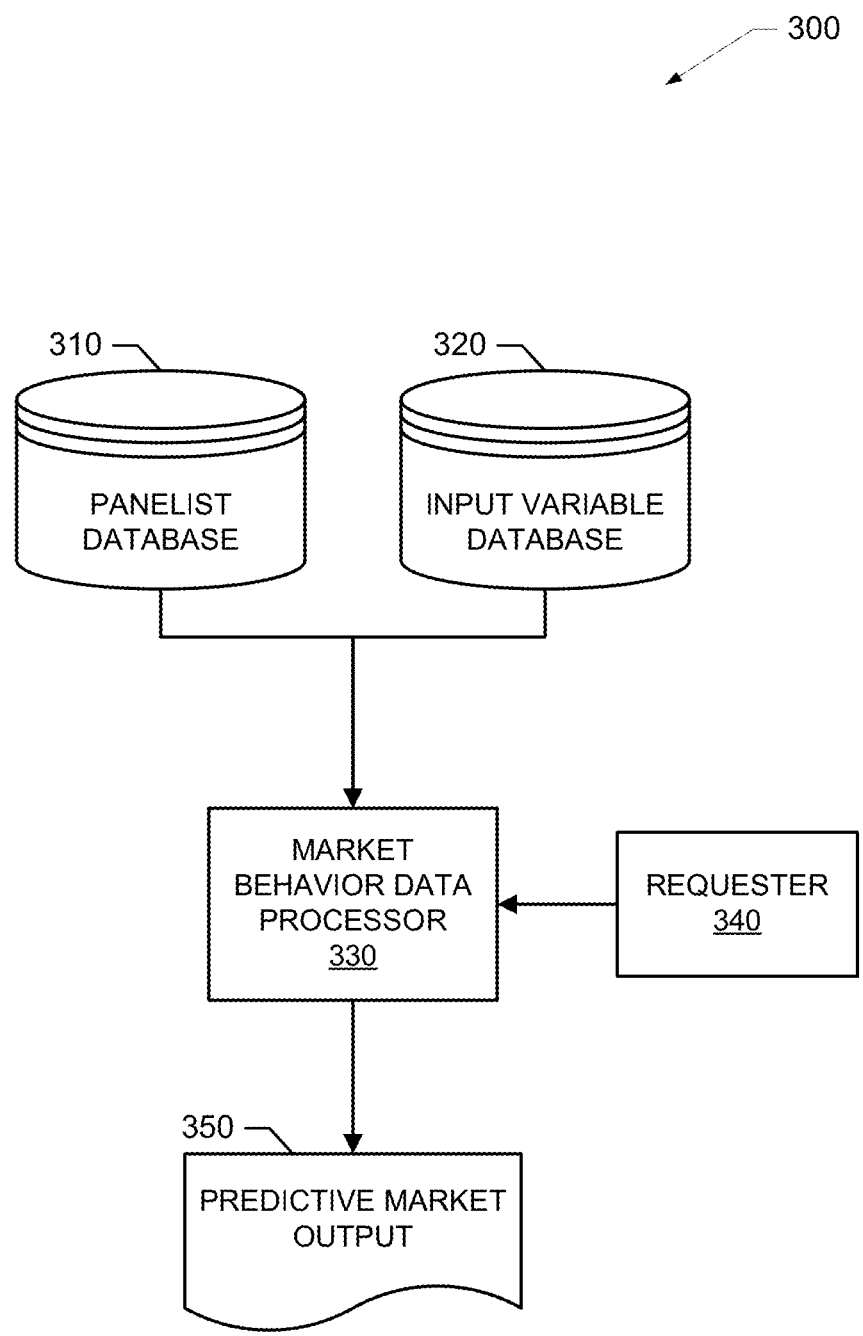
FIG. 3 depicts an example market behavior data mapping and analytics system including a panelist database, an input variable database, a market behavior data processor, a requester, and a predictive market output.

Data processing systems, such as market behavior data processing systems, are disclosed. FIG. 3 depicts an example market behavior data mapping and analytics system 300 including a panelist database 310, an input variable database 320, a market behavior data processor 330, a requester 340, and a predictive market output 350. As will be described in further detail below, based on a request for market behavior information from the requester 340, an input (e.g., an input vector having multiple constituent values) from the input variable database 320 is provided to the market behavior data processor 330. Based on the input from the input variable database 320, the market behavior data processor 330 retrieves panelist information from the panelist database 310 and processes the panelist information with respect to the input variable to provide the predictive market output 340 in response to the request.

For example, a request or other client question, such as what type of people will likely be interested in buying a certain soap, car, beverage, electronic device, etc., from the requester 340 is received by the market behavior data processor 330. In response to receiving the request, the market behavior data processor 330 requests one or more input variables, such as income, household information, education level, geographic location, etc., from the input variable database 320. Additionally, the market behavior data processor 330 receives panelist information from the panelist database 310 and correlates the panelist data with the input variable(s) to classify the panelist (e.g., using fuzzy logic) and answer the question posed by the requester 340. The answer, such as a prediction of which people and/or population segment is likely to be interested in a product or service, is provided as the predictive market output 350.

Figure 4:
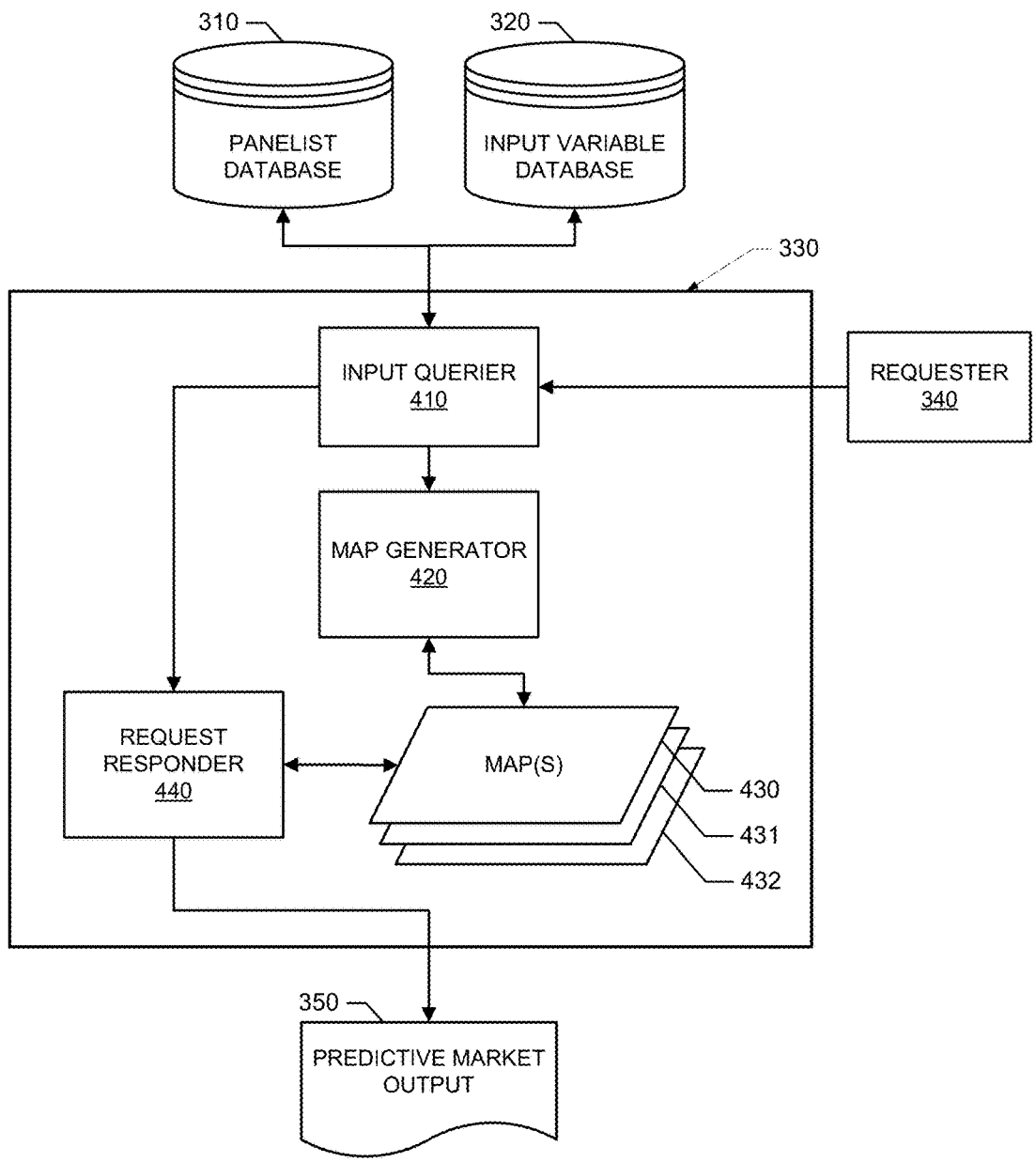
FIG. 4 provides further example detail regarding the market behavior data processor of the example of FIG. 3.

FIG. 4 provides further example detail regarding the market behavior data processor 330 of the example of FIG. 3. As illustrated in the example of FIG. 4, the market behavior data processor 330 can include an input querier 410, a map generator 420, a plurality of maps 430-432, and a request responder 440.

The input querier 410 retrieves input variables from the input variable database 320 and panelist data from the panelist database 310. In some examples, the input querier 410 organizes the panelist and input variable information to provide to the map generator 420 to construct one or more map(s) 430-432. In some examples, the input querier 410 receives a request (e.g., a client market question) from the requester 340, and parses the request to identify keywords in the request. For example, a request of "identify people would be interested in buying a new minivan" is parsed to become "people", "purchase", and "minivan" organized in a query for the panelist and input variable databases 310, 320. In some examples, the requester 340 has already extracted keywords from a submitted request and provides the keywords to the input querier 410. The extracted keywords are used by the input querier 410 to form a query to the input variable database 320 for one or more input variables relevant to the request. The input variables from the input variable database 320 are also used by the input querier 410 to extract relevant panelist information from the panelist database 310 to answer the query from the requester 340.

Thus, the input querier 410 receives a sample from a population of respondents (also referred to as panelists) and ordinal category(-ies) (also referred to as input(s)) associated with the respondents and provides that information to the map generator 420. The map generator 420 groups the respondent information according to a topological map to create groups (also referred to as clusters or classes) of respondents. The map (e.g., a self-organizing map) is trained based on the sample respondent information, the categories, and the groups of respondents.

For example, the map generator 420 employs one or more neural networks to construct and train a two-dimensional SOM based on the panelist data and input categories. The two-dimensional SOM organizes respondents into groups or classes, each represented by a node in the map 430-432, and uses fuzzy logic to assign a fuzzy scale of each person belonging to each class from an available plurality of classes (e.g., 400 classes formed from a 20×20 map of nodes in the examples of FIG. 1). Using fuzzy logic, for example, a fuzzy scale or score can be preserved in the map to indicate "how much" an input person is "in" that map (e.g., a person is in a first category 50% of the time, in a second category 25% of the time, and in a third category 25% of the time). In certain examples, each person has a dominant class based on his or her characteristics, habits, etc., but also sometimes behaves according to another class. Thus, the person is most often in one class but is also sometimes likely to be in another class.

In the SOM, a node corresponding to a group of respondents "competes" with other nodes to determine which of the nodes best matches a particular input. That is, the map generator 420 evaluates and organizes the nodes automatically using the neural network(s) to generate one more SOMs 430-432 weighting some nodes more than others based on their correspondence to a particular aspect of the input vector (e.g., one more inputs from the input variable database 320).

Thus, weights can be randomly assigned to nodes and then re-distributed over multiple iterations into a map of stable nodes to provide a feature map 430-432 of a space for the input variable. After a best matching node is identified for the particular input variable, the remaining nodes are weighted with respect to that best matching node. For example, panelists are organized into clusters or classes using a fuzzy scale to assign a panelist to a certain percentage in each available class, and then nodes representing those clusters are identified by a map as being stronger, weaker, etc., with respect to each input variable (e.g., members of cluster 1 have a high income, members of cluster 2 have large households, members of cluster 3 have low retirement savings, etc.).

After an SOM or group of SOMs 430-432 has been trained to classify panelists, the SOMs 430-432 can then be used in a mapping mode to answer a question and/or used in another training mode to re-classify panelists according to a new input vector. Weights can be represented using coloration, pattern, etc., for each node in the map 430-432 (see, e.g., SOMs 102-122 in the example of FIG. 1). A new request can be provided to the input querier 410, and resulting information provided to the map generator 420 can be applied to the map(s) 430-432. Respondents are classified based on the input categories and groups/clusters using the trained SOM.

The request responder 440 retrieves information from the SOM(s) 430-432 to answer the question or request posed by the requester 340. For example, certain weighted nodes in a map 430-432 represent a group or cluster of panelists representative of that input category (e.g., low income, high income, several children, no children, large savings, small savings, young, old, employed, unemployed, college-educated, no college education, etc.). In some examples, respondents can be grouped based on answer, respondent characteristic(s), etc. to provide a smaller number of groups or clusters for evaluation. Subsets including a plurality of similar groups can be identified from the SOMs 430-432 to answer a client question. For example, Groups 1, 3, 5, 10, and 200 out of 400 might be interested in a certain brand of soap, while Groups 300, 302, and 317 are a target audience for a luxury sports car. In certain examples, characteristics from a group of panelists can be extrapolated to a universe of people (e.g., statewide, nationwide, worldwide, etc.). The request responder 440 provides the predictive market output 350 including information such as a description of class(es) best matching the request, etc.

Figure 5:
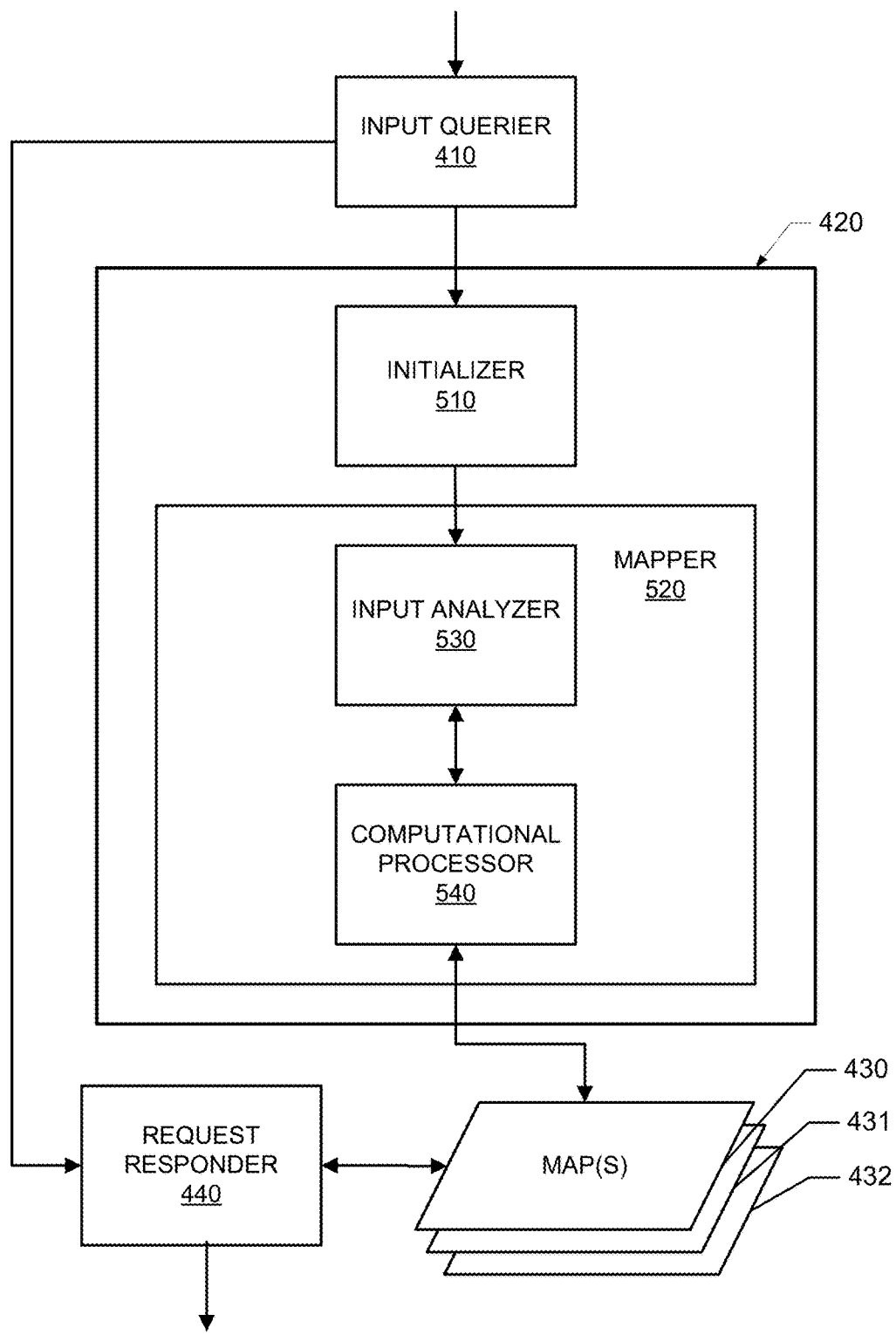
FIG. 5 provides further example detail regarding the map generator of the example of FIG. 4.

FIG. 5 provides further example detail regarding the map generator 420 of the example of FIG. 4. As illustrated in the example of FIG. 5, the map generator 420 can include an initializer 510 and a mapper 520. The example mapper includes an input analyzer 530 and a computational processor 540. The example map generator 420 calculates to which cluster (e.g., which primary class) each panelist belong and applies weights to the clusters as they relate to each of a plurality of inputs in an input vector.

In the example of FIG. 5, the initializer 510 receives input from the input querier 410. The input includes a plurality of potential classifications (e.g., classes), a vector of input variables and a set or sample of panelists/respondents that provide inputs to neurons or nodes in a self-organizing map (e.g., SOMs 430-432). The initializer 510 configures the input to be applied to the mapper 520 to form the SOMs 430-432. The mapper 520 receives and iteratively processes the input to form an array of nodes or neurons providing a probability of class membership for each panelist in the input by maximizing or increasing inter-class variation and minimizing or reducing intra-class variance between groups of panelists.

The mapper 520 receives the input from the initializer 510, and the input analyzer 530 produces source nodes representing features or attributes of the input sample from the initializer 510. The example input analyzer 530 forms an input vector for the input sample, and the vector can include a number of nodes equal to the number of features in an input layer or layout provided by the input analyzer 530.

The example computational processor 540 of the mapper 520 processes and organizes the information in the input layer provided by the input analyzer 530 to form nodes of panelists (e.g., clusters or classes of panelists) and organize those nodes by weight to generate topological maps 430-432 organizing panelists into clusters/class, indicating an impact or weight of each input variable on each cluster/class, and determining a percentage or value or class membership for each cluster of panelists.

The computational processor 540 uses the input to generate one or more SOMs that include a two-dimensional network of nodes. An input variable or category corresponds to a computational layer or map of nodes, and a given cluster of panelists is represented by a same node across multiple layers or maps corresponding to various input variables in an input vector. For example, a node 124-144 in maps 102-122 corresponds to the same cluster of panelists and reflects the weight for each input variable associated with that cluster. Initially, the computational processor 540 assigns a random weight vector to each neuron representing a panelist. The random weight vector is of the same size as the dimension (e.g., number of features) of the input vector. Input samples from the input dataset provided to the computational processor 540 by the input analyzer 530 take turns stimulating the neurons, which automatically adjusts the weight associated with each neuron. A most stimulated (e.g., most similar) neuron and its neighbors are weighted more so that they better resemble the stimulating input. Neurons that are topologically farther away from the most stimulated or "winning" neuron gradually decrease.

Thus, while neurons are initially be weighted at a certain value, and weights are adjusted as neuron values are evaluated and compared to other neurons. From a given pool of neuron weights, neuron values that are weaker or lesser for a particular variable lose weight, which is then given to neurons having values that are stronger/greater for that particular variable, for example. Over time, neurons or clusters associated with certain panelists are activated more strongly for certain input variables and more weakly for other input variables to develop a profile for that cluster across the plurality of SOMs (and, by association, across the input variables associated with the SOMs).

Thus, weights may initially be randomly assigned to nodes, and weights will be re-distributed over multiple iterations into a map of stable nodes to provide a feature map of a space for the input variable. After a best matching node is identified for the particular input variable, the remaining nodes are weighted with respect to that best matching node (e.g., the panelist that is "strongest" with respect to that particular input variable).

Using the computational processor 540, an unorganized network of neurons in the map is transformed from an unordered map to a stable topologically ordered map of clusters of neurons represented as single nodes in the map. Each cluster or node includes panelists that exhibit similar characteristics with respect to the input variables, and each panelist forms a fuzzy probability of class membership across all available classes provided to the computational processor 540. The ordering and weighting of panelists occurs through the computational processor 540 into one or more SOMs 430-432 in a self-organizing, unsupervised manner without external assistance or override.

Thus, in a SOM, input vector dimensionality can be reduced to a two-dimensional map representation while maintaining topological relationships between the data. Data vectors may be normalized into unit vectors (e.g., vectors of length one) before being applied to train an SOM, for example. After an SOM or group of SOMs has been trained, the SOMs can then be used in a mapping mode to classify a new input vector. Weights can be represented using coloration, pattern, etc., for each node in the map. In addition to use via the SOM, colorized/patterned nodes can be utilized in other visualization as well. For example, panelist income mapping can be combined with geographic location to generate a geographic map of panelist location colored according to panelist income.

The computational processor 540 of the example mapper 520 in the map generator 420 provides one or more maps 430-432 based on the processing of panelist data according to input variables. The maps 430-432 are associated with fuzzy class membership information for panelists. The maps 430-432 are then utilized by the request responder 440 to answer the question posed by the requester 340 (provided by the input querier 410 disclosed above).

Class percentage and characteristic information for one or more similar clusters of panelists is extracted from the map(s) 430-432 by the request responder 440 based on the request or query provided to the request responder 440 via the input querier 410. For example, weights and fuzzy class membership scores for clusters of panelists can be used to classify the input query and provide an answer to the associated question. In certain examples, the request responder 440 is provided with panelist behavior (e.g., purchased a luxury car, shops at a warehouse club, drives a sport utility vehicle, etc.), which can be extrapolated to reflect behavior of a cluster, class, and/or universe of people with which the panelists are associated.

As described further below, behavior, classification, and weight can be used by the request responder 440 to provide an answer to the question posed by the requester 340. For example, using the map(s) 430-432, the request responder 440 can identify and provide a sample population (e.g., panelist, class, universe, etc.) that is likely to be interested in a particular product and/or service as the predictive market output 350 in response to the query. In certain examples, a new set of input variables triggers a re-initialization by the initializer 510 and a re-generation of map(s) 430-432 by the mapper 520 and its constituent input analyzer 530 and computational processor 540.

While an example manner of implementing the example market behavior data mapping and analytics system 300 and associated map(s) are illustrated in FIGS. 1 and 3-5, one or more of the elements, processes and/or devices illustrated in FIGS. 1 and 3-5 may be combined, divided, re-arranged, omitted, eliminated and/or implemented in any other way. Further, any of the example market data processor 330, the example requester 340, the example predictive market output 350, the example input querier 410, the example map generator 420, the example map(s) 430-432, the example request responder 440, and/or, more generally, the example market behavior data mapping and analytics system 300 of FIGS. 3-5 may be implemented by hardware, software, firmware and/or any combination of hardware, software and/or firmware. Thus, for example, any of the example market data processor 330, the example requester 340, the example predictive market output 350, the example input querier 410, the example map generator 420, the example map(s) 430-432, the example request responder 440, and/or, more generally, the example market behavior data mapping and analytics system 300 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example market data processor 330, the example requester 340, the example predictive market output 350, the example input querier 410, the example map generator 420, the example map(s) 430-432, the example request responder 440, and/or, more generally, the example market behavior data mapping and analytics system 300 is/are hereby expressly defined to include a tangible computer readable storage device or storage disk such as a memory, a digital versatile disk (DVD), a compact disk (CD), a Blu-ray disk, etc. storing the software and/or firmware. Further still, the example market behavior data mapping and analytics system 300 of FIGS. 1 and 3-5 may include one or more elements, processes and/or devices in addition to, or instead of, those illustrated in FIGS. 1 and 3-5, and/or may include more than one of any or all of the illustrated elements, processes and devices.

Example Market Behavior Data Mapping and Analytics Methods

Flowcharts representative of example machine readable instructions for implementing the example market behavior data mapping and analytics system 300 of FIGS. 1 and 3-5 are shown in FIGS. 6-7 and 14-16. In this example, the machine readable instructions comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 6-7 and 14-16, many other methods of implementing the example market behavior data mapping and analytics system 300 of FIGS. 1 and 3-5 may alternatively be used. For example, the order of execution of the blocks may be changed, and/or some of the blocks described may be changed, eliminated, or combined.

As mentioned above, the example processes of FIGS. 6-7 and 14-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 and 14-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
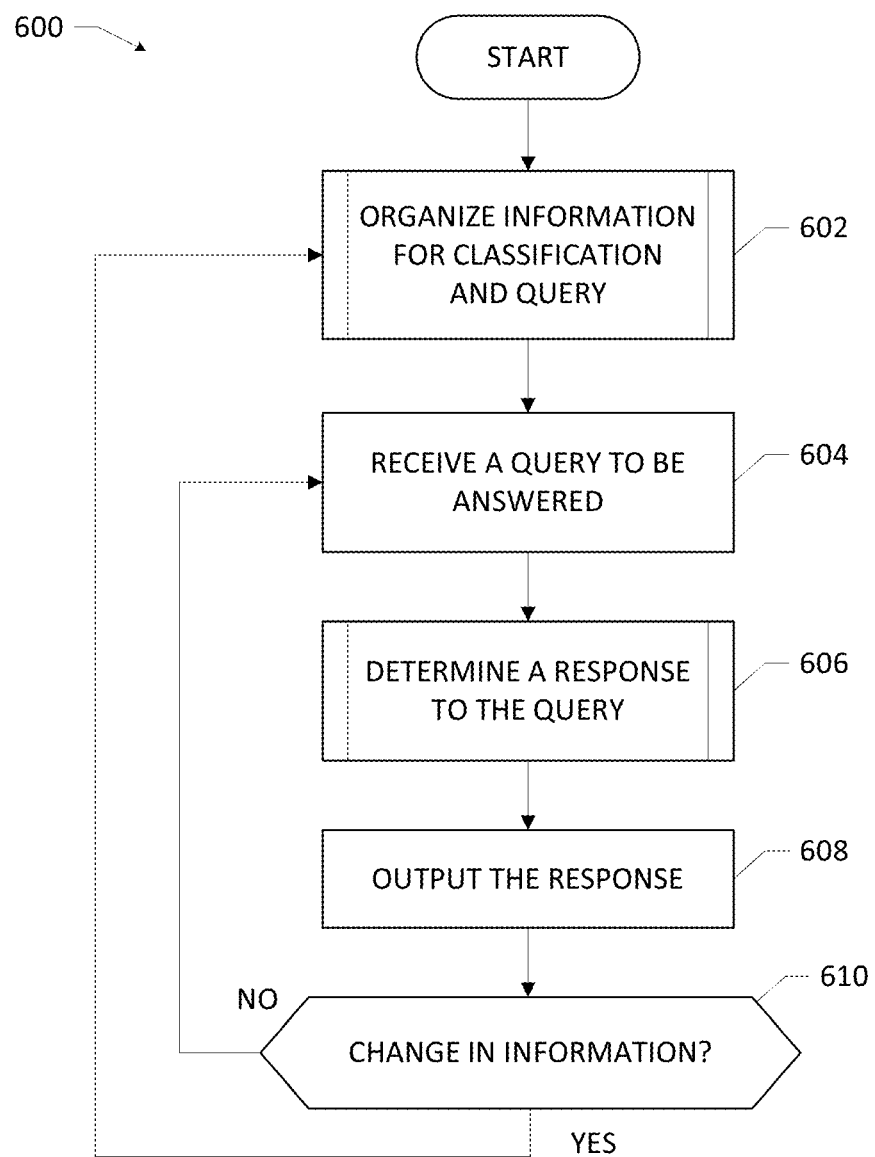
FIG. 6 is a flow diagram representative of example machine readable instructions that may be executed to implement an example market behavior data mapping and analytics process including the example market behavior data mapping and analytics system of FIG. 3 and its components.

FIG. 6 is a flow diagram representative of example machine readable instructions 600 that may be executed to implement an example market behavior data mapping and analytics process including the example market behavior data mapping and analytics system 300 of FIG. 3 and its components (see, e.g., FIGS. 3-5).

At block 602, a data processing system, such as the example market behavior data mapping and analytics system 300 and its market behavior data processor 330, organizes information for classification and query. For example, the example market behavior data processor 330 of FIG. 3 gathers input from the input variable database 320. Based on the input from the input variable database 320, the market behavior data processor 330 retrieves panelist information from the panelist database 310 and processes the panelist information with respect to the input variable. Processing panelist information with respect to the input categories/variables can result in generation of one or more SOMs of panelist information, for example. Certain examples implementing block 602 are described further below with respect to FIG. 7.

At block 604, a question or query to be answered is received. For example, a request or other client question, such as what type of people will likely be interested in buying a certain soap, car, beverage, electronic device, etc., from the requester 340 is received by the market behavior data processor 330.

At block 606, a response to the query is determined. For example, in response to receiving a query, the market behavior data processor 330 requests one or more input variables, such as income, household information, education level, geographic location, etc., from the input variable database 320. Additionally, the market behavior data processor 330 receives panelist information from the panelist database 310 and correlates the panelist data with the input variable(s) to classify the panelist (e.g., using fuzzy logic) and answer the question posed by the requester 340. Certain examples implementing block 606 are described further below with respect to FIG. 16.

At block 608, the response to the query is provided. For example, the answer, such as a prediction of which people and/or population segment is likely to be interested in a product or service, is provided as the predictive market output 350. The example output 350 can include a class identification, a set of applicable characteristics, example class behavior, etc. The example output 350 can include a data output (e.g., data to trigger action another program and/or system, etc.) and/or a visual output (e.g., a topological output, etc.), for example.

At block 610, a change in input and/or panelist information is evaluated. If a change is detected, then control returns to block 602 to re-organize information for classification and query according to the updated input variable(s) and/or panelist information. If no change is detected, then control returns to block 604 to receive a new query.

Figure 7:
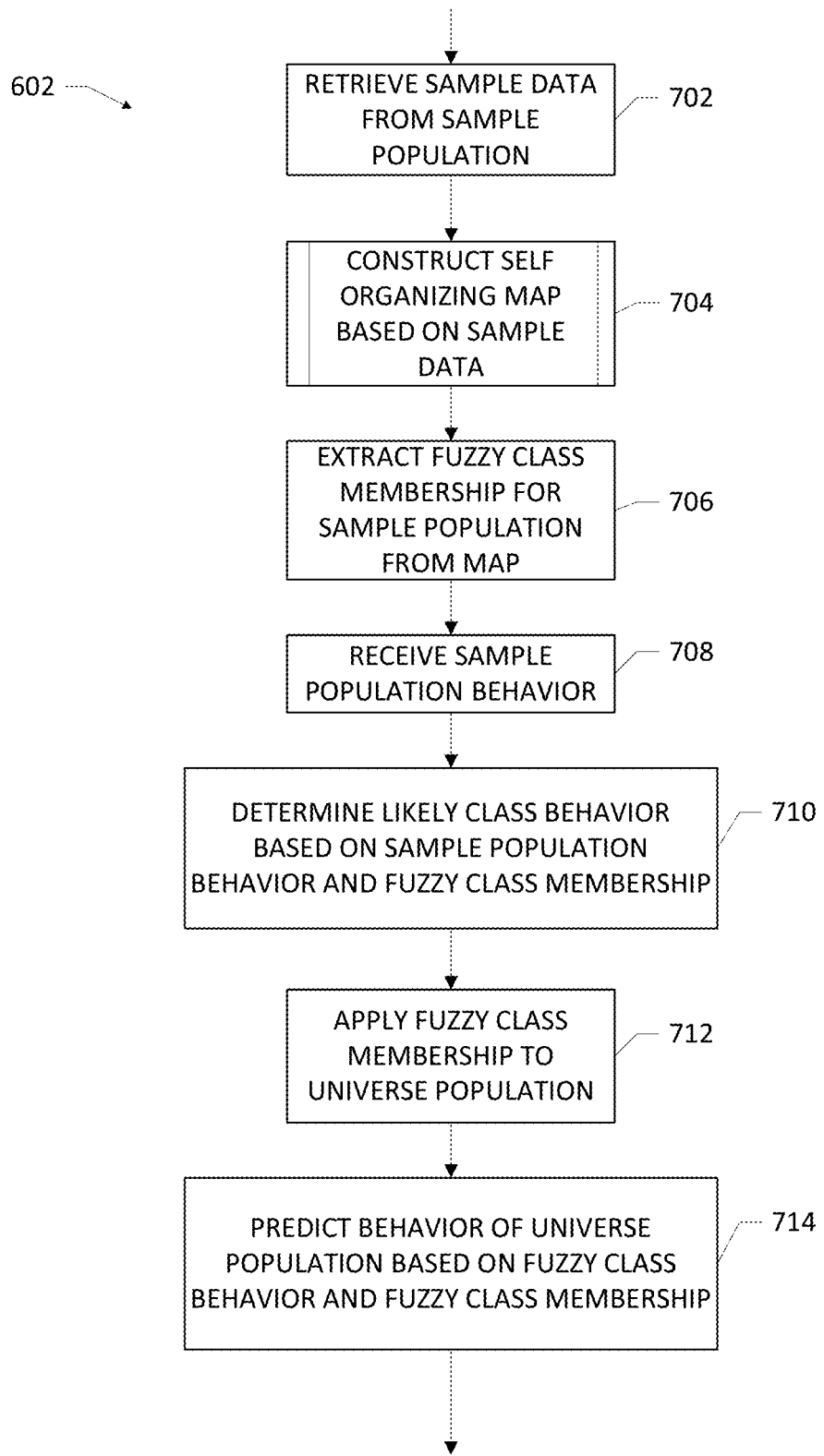
FIG. 7 is a flow diagram representative of example machine readable instructions that may be executed to implement the example market behavior data processor of FIGS. 3-5 and its components.

FIG. 7 is a flow diagram representative of example machine readable instructions that may be executed to implement the example market behavior data processor 330 of FIGS. 3-5 and its components (e.g., the example input querier 410, map generator 420, map(s) 430-432, and request responder 440 of FIG. 4). The example process of FIG. 7 provides additional and/or related detail regarding execution of block 602 of the example process 600 of FIG. 6 to organize information for classification and query.

At block 702, sample data from a sample population is retrieved by the input querier 410. For example, the input querier 410 receives a sample from a population of respondents (also referred to as panelists) and ordinal category(-ies) (also referred to as input(s)) associated with the respondents.

At block 704, the map generator 420 constructs a self-organizing map using the sample data. For example, the map generator 420 receives the data from the input querier 410 and groups the respondent information according to a topological map to create groups of respondents in certain fuzzy classifications (e.g., each respondent having a certain membership in each available class rather than solely in one class). The map (e.g., a self-organizing map) is trained based on the sample respondent information and the categories to group and classify the respondents and weight the input variables with respect to the groups or classes of respondents. Certain examples implementing block 704 are described further below with respect to FIGS. 14-15.

Figure 8:
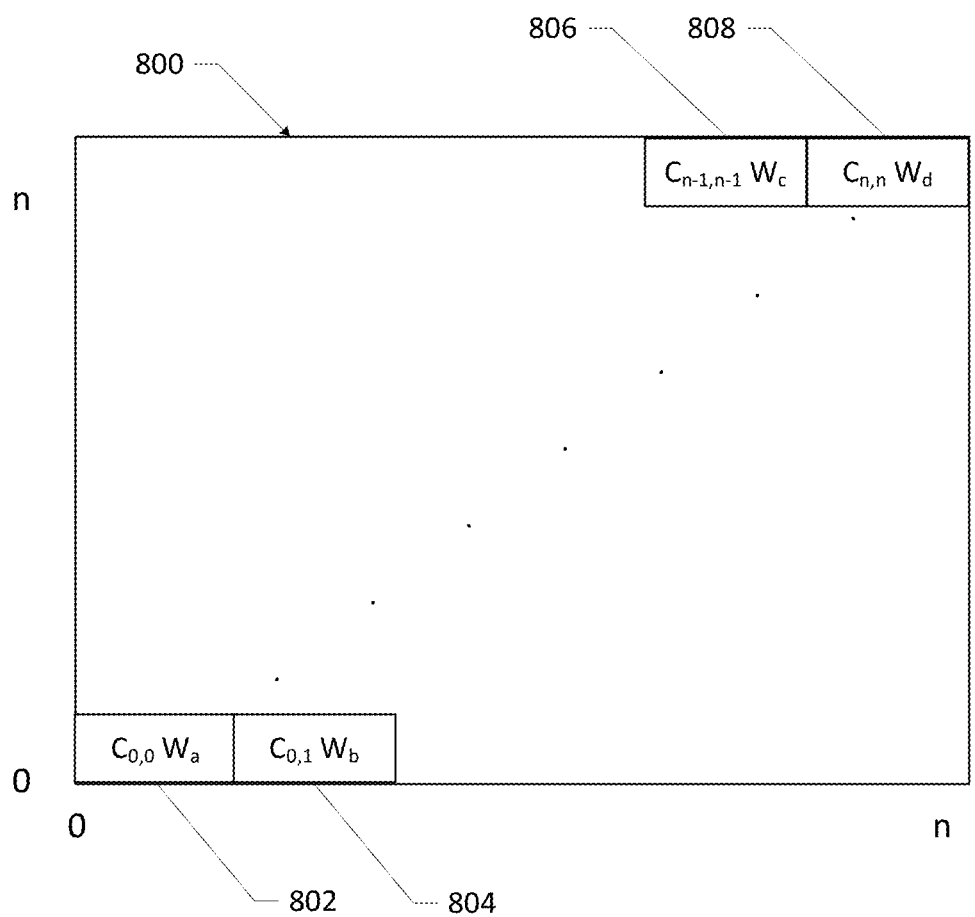
FIG. 8 shows an example SOM including a plurality of nodes arranged in a two-dimensional topological map.

For example, the map generator 420 employs one or more neural networks to construct and train a two-dimensional SOM based on panelist data and input categories. Example SOMs are depicted in FIG. 1 and also in FIG. 8. As shown in the example of FIG. 8, an SOM 800 includes a plurality of nodes 802-808 arranged in a two-dimensional topological map having coordinates 0 to n on x and y axes such that clusters of panelists are represented by nodes 802-808 (positioned at coordinates 0,0 to n,n). As shown in the example 800, each node 802-808 has a coordinate ($C_{0,0}$ to $C_{n,n}$) and a weight (e.g., represented in the example of FIG. 8 as weights $W_a$, $W_b$, $W_c$, $W_d$).

The two-dimensional SOM 800 groups the respondents into clusters of similar panelists and uses fuzzy logic to assign a fuzzy scale of each person belonging to each class from an available plurality of classes. Using fuzzy logic, for example, a fuzzy scale or score can be preserved in the map to indicate "how much" an input person is "in" that map (e.g., a person is in a first class 50% of the time, in a second class 25% of the time, and in a third class 25% of the time). A node corresponding to a group of respondents "competes" with other nodes to determine which of the nodes best matches a particular input. That is, the map generator 420 evaluates and organizes the nodes automatically using the neural network(s) to generate one more SOMs 430-432, 800 grouping individual panelists into classes and weighting some nodes more than others based on their correspondence to a particular aspect of the input vector (e.g., one more inputs from the input variable database 320).

Thus, weights can be randomly assigned to nodes and then re-distributed over multiple iterations into a map of stable nodes to provide a feature map 430-432, 800 of a space for the input variable. After a best matching node is identified for the particular input variable, the remaining nodes are weighted with respect to that best matching node. For example, panelists are organized into clusters or classes using a fuzzy scale to assign a panelist to a certain percentage in each available class, and then nodes representing those classes are identified by a map as being stronger, weaker, etc., with respect to each input variable (e.g., members of class 1 have a high income, members of class 2 have large households, members of class 3 have low retirement savings, etc.).

Figure 9:
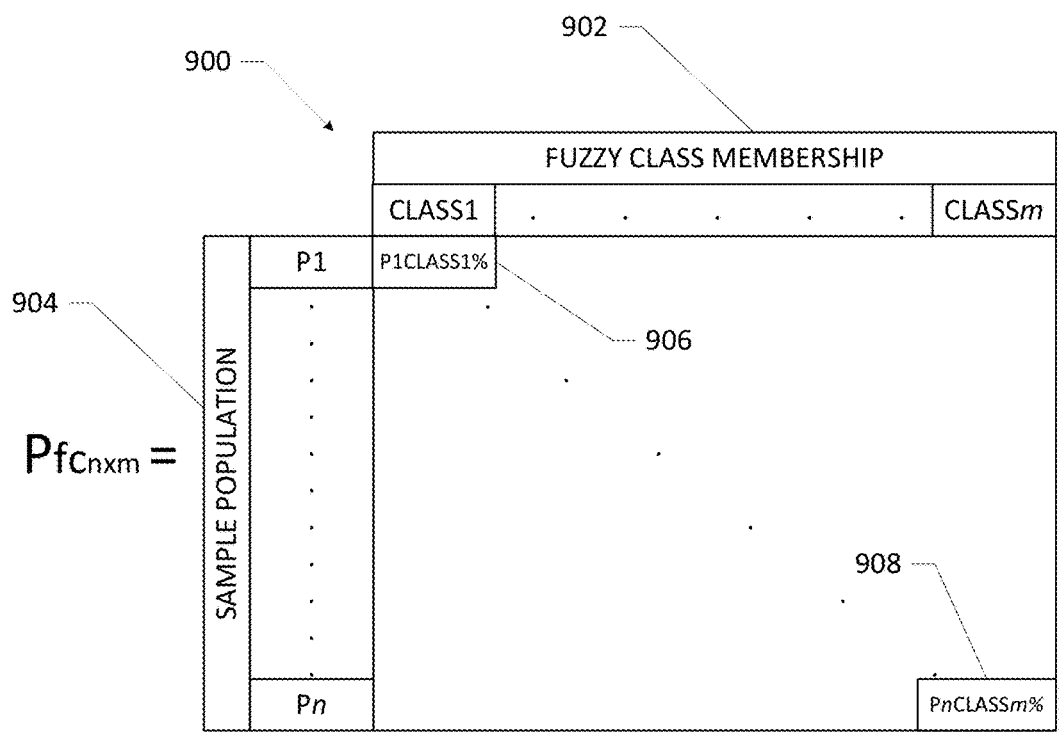
FIG. 9 shows an example mapping of fuzzy class membership for each respondent in the sample population being processed.

At block 706, the fuzzy classification of respondents is extracted from the one or more maps 430-432. For example, the map generator 420 and/or request responder 440 can extract the fuzzy classification information for respondents from the map(s) 430-432, 800. FIG. 9 shows an example mapping 900 (e.g., a matrix) of fuzzy class membership 902 for each respondent 904 in the sample population being processed.

As discussed above, using fuzzy logic, each panelist in the sample population 904 has a certain percentage membership in each available class 902. For example, panelist 1 is a certain percentage in class 1 906 and panelist n is a certain percentage in class m 908. Based on the cluster arrangement of the nodes in the map and node weight with respect to the input variables, fuzzy class membership is determined. For example, the map generator 420 compares a cluster in which the map 800 groups the panelist and a weight associated with the panelist cluster for each input variable with each class definition to determine the fuzzy class membership for each panelist.

In certain examples, each panelist 904 has a dominant class 902 for which he or she is a member a majority of the time. Each panelist 904, however, is also a certain percentage member of the other available classes 902 (e.g., while a person may most identify with a particular class, the person's behavior does not always fit the definition of that single class).

After an SOM 800 or group of SOMs 430-432 has been trained to classify panelists, the SOMs 800, 430-432 can then be used in a mapping mode to answer a question and/or used in another training mode to re-classify panelists according to a new input vector. Weights can be represented using coloration, pattern, etc., for each node in the map 800, 430-432 (see, e.g., SOMs 102-122 in the example of FIG. 1). A new request can be provided to the input querier 410, and resulting information provided to the map generator 420 can be applied to the map(s) 430-432. Respondents are classified based on the input categories and groups/clusters using the trained SOM.

Figure 10:
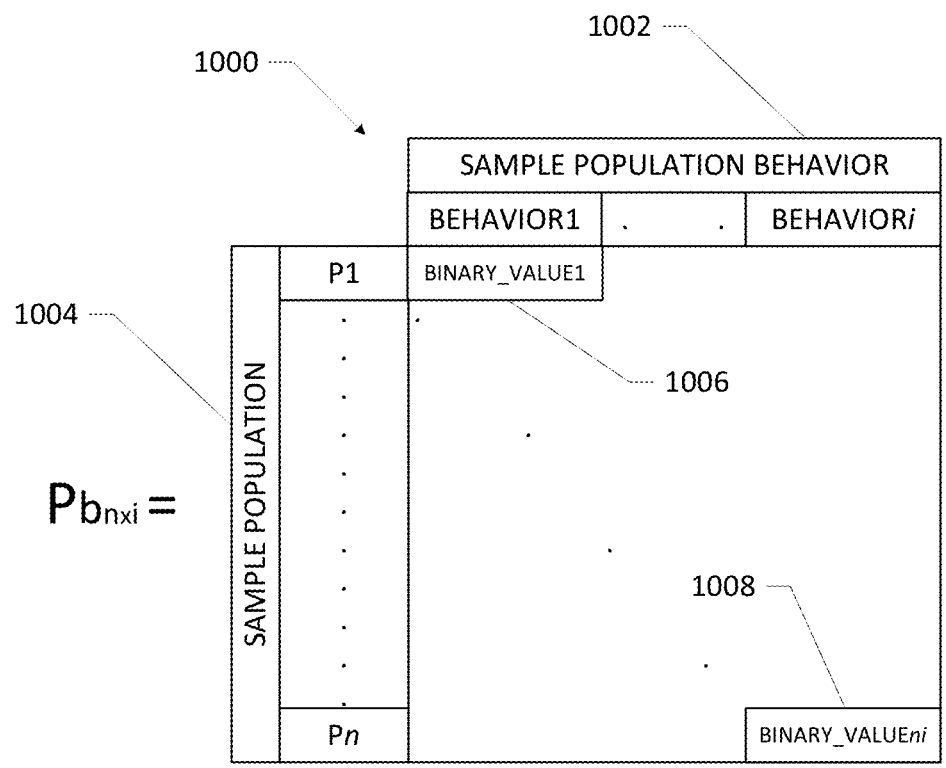
FIG. 10 illustrates an example matrix in which a plurality of behaviors are correlated with each member of the sample population who exhibited that behavior.

At block 708, the request responder 440 (and/or the map generator 420) receives panelist behavior information for the sample population used to generate the map(s) 430-431 from the panelist database 310 via the input querier 410. For example, panelist activities (e.g., purchased luxury car, shops at warehouse club, drives a sports utility vehicle, etc.) are provided to the request responder 440. Panelist behavior can be organized according to a matrix, such as shown in the example of FIG. 10. As illustrated in the example matrix 1000 of FIG. 10, a plurality of behaviors 1002 are correlated with each member of the sample population 1004 who exhibited that behavior. In certain examples, rather than a percentage, a binary value is used to indicate whether or not a particular respondent has exhibited a particular behavior (e.g., Panelist 1 has not purchased a luxury car and does not drive a sport utility vehicle but does shop at a warehouse club). Thus, each panelist in the sample population 1004 has a value 1006, 1008 in the matrix 1000 indicating whether or not that panelist has been identified as exhibiting that behavior.

At block 710, the behavior information and fuzzy class information for the sample population (e.g., the panelists/respondents) are used by the request responder 440 (and/or the map generator 420) to determine likely class behavior. For example, knowing fuzzy class membership for panelists and behavior information for each of those panelists allows the request responder 440 to extrapolate likely behavior of each class. Linear algebra, such as matrix multiplication, can be used to combine fuzzy class panelist for each panelist along with behavior for each panelist. Thus, knowing activities of each panelist in a class or cluster of the SOM 800, 430-432, the request responder 440 can determine the likelihood that a member of the class to perform a certain task.

Figure 11:
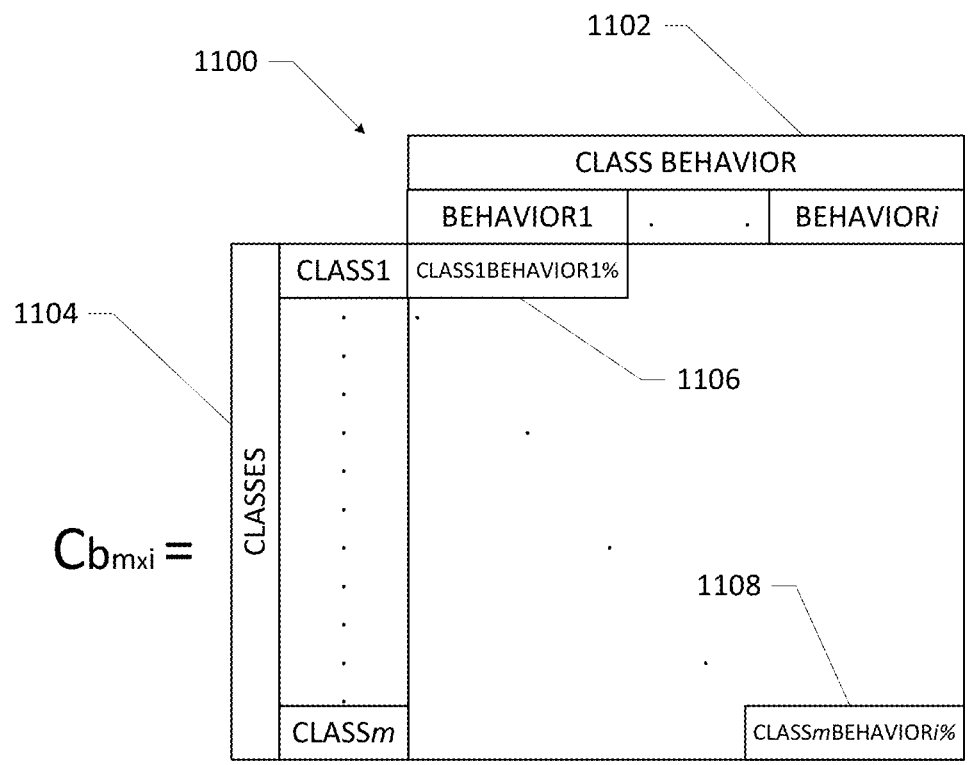
FIG. 11 illustrates an example class behavior matrix.

For example, the example fuzzy class membership matrix 900 can be multiplied by the example panelist behavior matrix 1000 to determine an example class behavior matrix 1100, such as shown in the example of FIG. 11. Thus, for example, a plurality of panelists belonging to a class by varying percentages and a recorded behavior for each such panelist can be combined (e.g., multiplied, averaged, etc.) to determine a likelihood that members of a given class will exhibit a given behavior (e.g., a likelihood that class members have or will purchase a luxury car, shop at a warehouse store, drive a sport utility vehicle, etc.). As shown in the example of FIG. 11, class 1 has a determined percentage likelihood 1106 of exhibiting a first behavior, a class m has a determined percentage likelihood 1108 of exhibiting an $i^{th}$ behavior, etc.

At block 712, fuzzy class membership is extended to a larger population, such as a universe. For example, panelist fuzzy class membership and associated characteristics can be extrapolated and applied to a larger universe of people (e.g., the population of the United States, the world population, etc.) to determine universe fuzzy class membership. For example, assuming that a given panelist is representative of a plurality of other people, the fuzzy class membership of such other people can be extrapolated based on the fuzzy class membership of the panelist.

Figure 12:
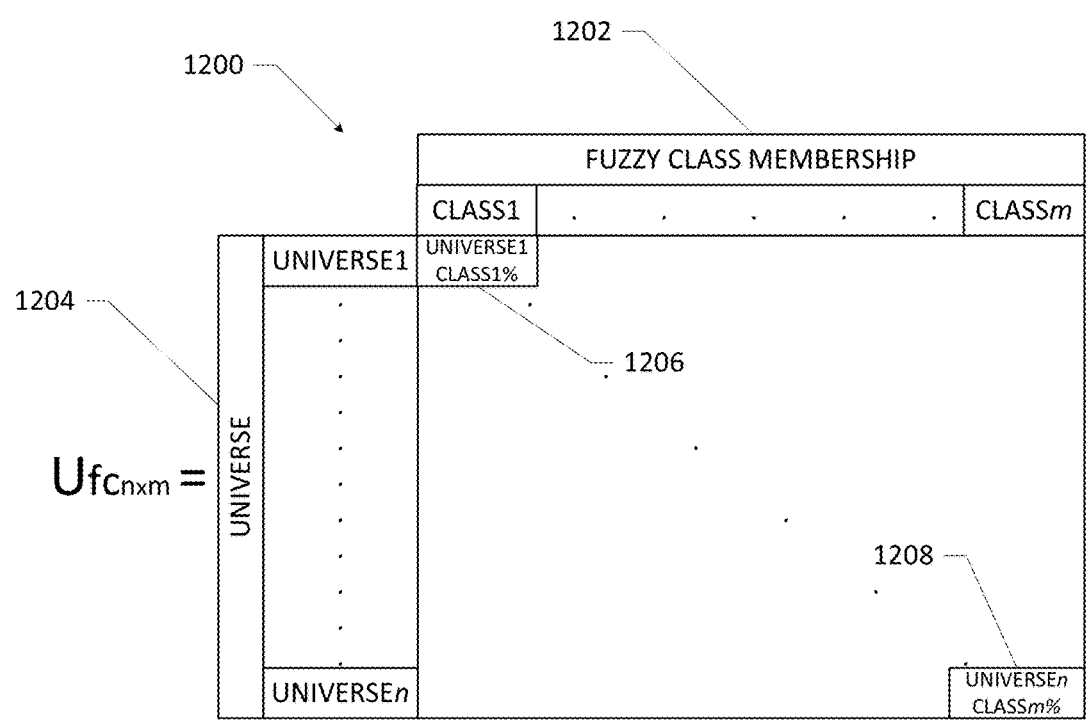
FIG. 12 depicts an example matrix including a plurality of classes and a plurality of universes and showing a fuzzy mapping of each universe to each of the plurality of classes.

FIG. 12 depicts an example matrix 1200 including a plurality of classes 1202 and a plurality of universes 1204, each universe 1 to n corresponding to a panelist (e.g., panelist 1 to n in the example of FIG. 9), and each class 1 to m corresponding to a panelist class (e.g., classes 1 to m in the example of FIG. 9). As shown in the example matrix 1200, a Universe 1 has a determined percentage 1206 in class 1, a Universe n has a determined percentage 1208 in class m, etc.

Figure 13:
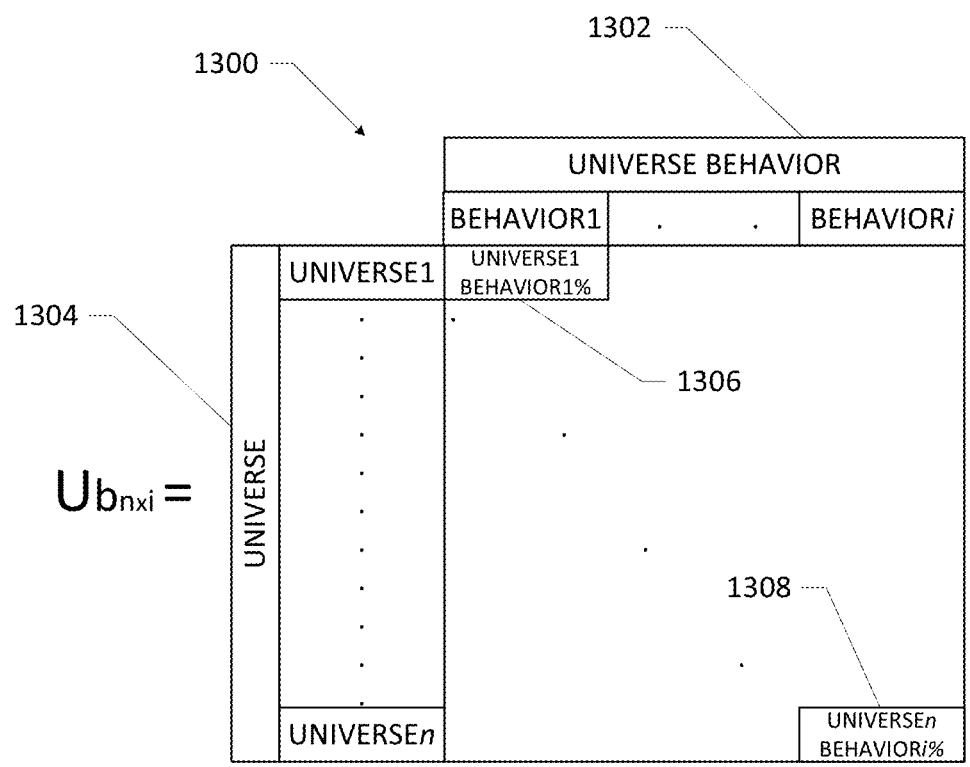
FIG. 13 depicts an example matrix correlating a universe behavior with each universe to determine a likelihood that a given universe will exhibit a given behavior.

At block 714, a fuzzy behavior of the universe is predicted based on the universe fuzzy class membership and the likely class behavior. For example, after determining a fuzzy class distribution for each universe, a likely behavior for each universe is determined. The example of FIG. 13 depicts an example matrix 1300 correlating a universe behavior 1302 with each universe 1304 to determine a likelihood that a given universe will exhibit a given behavior (e.g., a likelihood that the universe will purchase a luxury car, shop at a warehouse store, drive a sport utility vehicle, etc.). As shown in the example of FIG. 13, universe 1 has a determined percentage likelihood 1306 of exhibiting a first behavior, a universe n has a determined percentage likelihood 1308 of exhibiting an $i^{th}$ behavior, etc.

Figure 14:
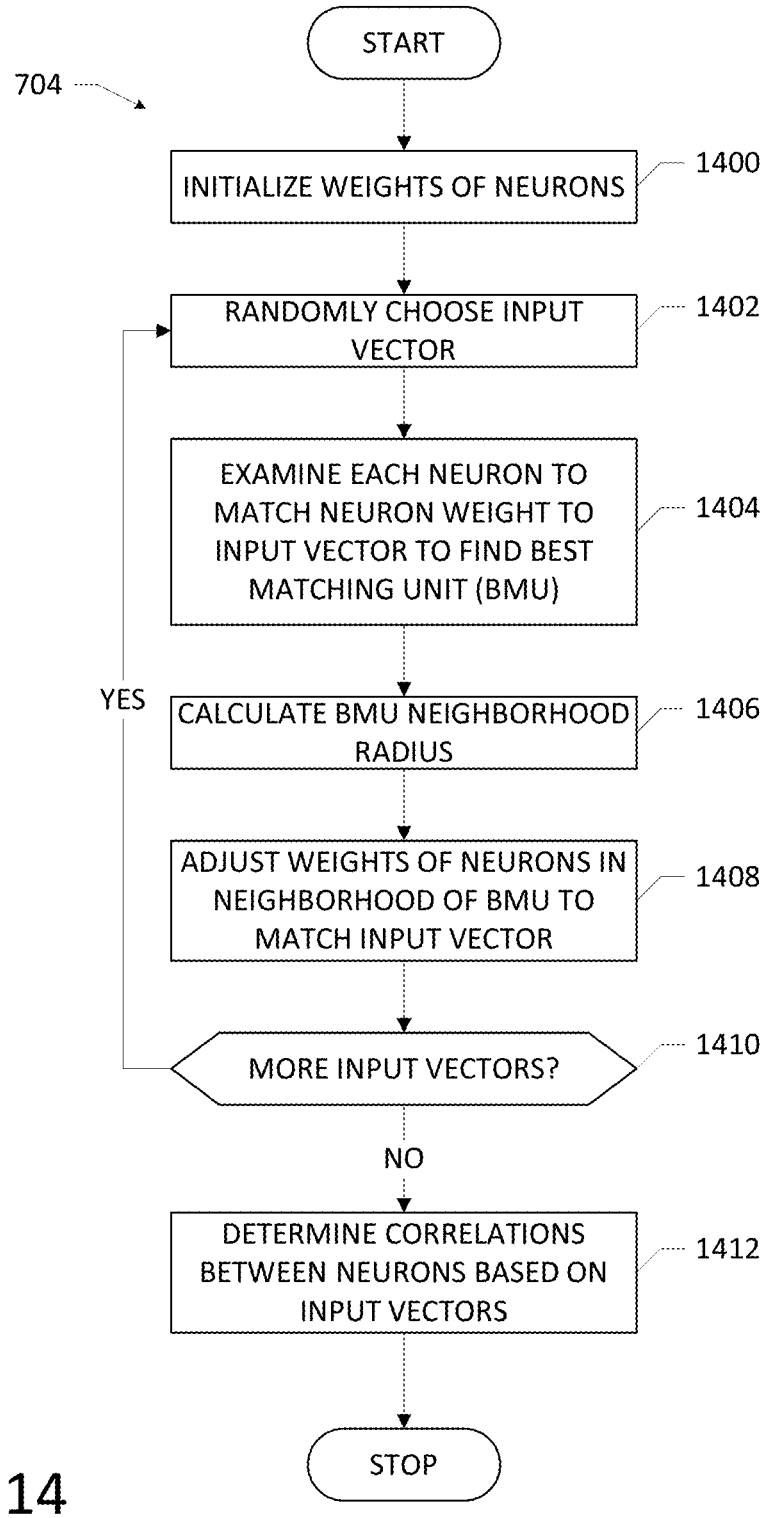
FIG. 14 is a flow diagram representative of example machine readable instructions that may be executed to generate a self-organizing map.

FIG. 14 is a flow diagram representative of example machine readable instructions that may be executed to generate a self-organizing map (e.g., SOMs 800, 430-432, etc.). The example process of FIG. 14 provides additional and/or related detail regarding execution of block 704 of the example process 602 of FIG. 7 to construct an SOM based on sample data.

At block 1400, weights associated with neurons are initialized. For example, the initializer 510 initializes weights associated with neurons or nodes representing panelists and/or groups of panelists. Weights can be initialized to a uniform weight (e.g., 0, 1, etc.) and/or can be distributed randomly, for example.

At block 1402, an input vector is randomly selected. For example, an input vector relating to panelist income is randomly chosen from a plurality of available input variables (e.g., income, household size, marital status, retirement savings, location, etc.) by the initializer 510 and/or the input analyzer 530.

At block 1404, the input analyzer 530 examines each node or neuron in the map and its associated weight to determine a best matching unit to the value(s) of the input vector. For example, the input analyzer 530 evaluates panelist node data to determine which node best matches the criterion and/or value(s) of the input vector (e.g., highly values income, for example). The neuron is labeled as the best matching unit (BMU).

At block 1406, a neighborhood radius of the BMU is calculated to identify like neurons near the BMU (e.g., within the neighborhood radius of the BMU node). For example, the computational processor 540 processes neurons and relationships between neurons to reduce or minimize intra-class (node) differences while increasing or maximizing inter-class differences to form groups of neurons in the resulting SOM 800, 430-432.

At block 1408, weights of neurons within the BMU neighborhood radius are adjusted to match the input vector. For example, neurons within a distance of the BMU node are adjusted by the computational processor 540 to match the input vector and form a group or class in the resulting SOM 800, 430-432.

At block 1410, additional input vectors are evaluated. If additional input vector(s) are present, control returns to block 1402 to randomly select and process sample data with respect to each input vector. However, if no additional input vector is present, then, at block 1412, correlations between neurons are determined based on the input vectors. For example, weighted nodes can be organized by the computational processor 540 into one or more layers of a resulting SOM 430-432, 800 and used to answer a query posed with respect to the population of the map.

Figure 15:
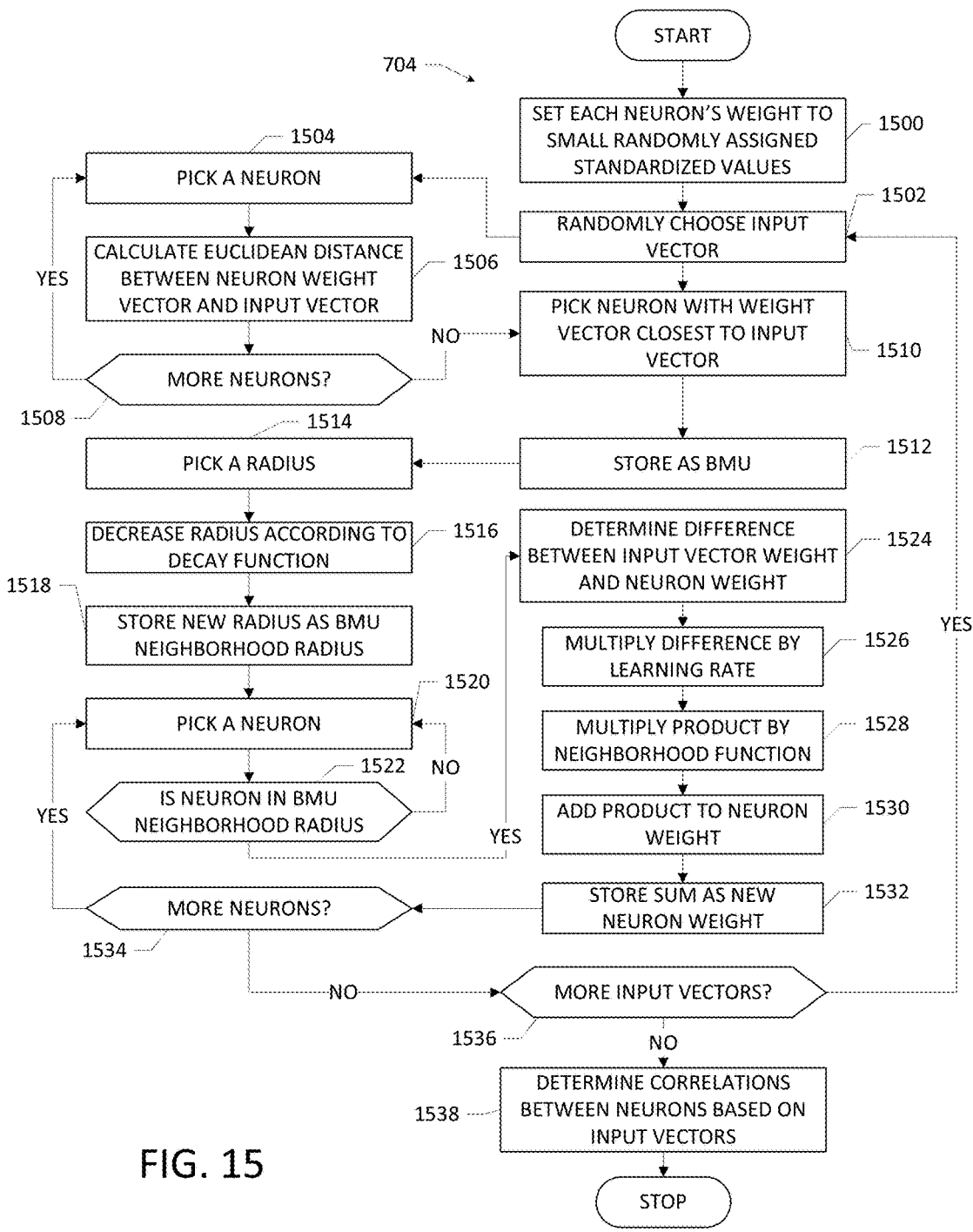
FIG. 15 is a flow diagram representative of example machine readable instructions that may be executed to generate a self-organizing map.

FIG. 15 is a flow diagram representative of example machine readable instructions that may be executed to generate a self-organizing map (e.g., SOMs 800, 430-432, etc.). As with FIG. 14, the example process of FIG. 15 provides additional and/or related detail regarding execution of block 704 of the example process 602 of FIG. 7 to construct an SOM based on sample data. The example process of FIG. 15, however, is a more detailed version of the example process described above with respect to FIG. 15.

At block 1500, weights associated with neurons are initialized. For example, the initializer 510 initializes weights associated with neurons or nodes representing panelists and/or groups of panelists. Weights can be initialized to small, randomly assigned standardized values and/or sampled evenly from a subspace spanned by two largest principal component eigenvectors in the subspace, for example.

At block 1502, an input vector is randomly selected. For example, an input vector relating to panelist income is randomly chosen from a plurality of available input variables (e.g., income, household size, marital status, retirement savings, location, etc.) by the initializer 510 and/or the input analyzer 530.

At block 1504, the computational processor 540 selects a neuron. Selection can be random, for example. At block 1506, a Euclidean or "straight-line" distance between a weight vector for the selected neuron and the input vector is calculated by the computational processor 540. The weight of the neuron relates to its distance from the input vector. Other distances, such as a link distance, etc., can be determined in addition to or instead of the Euclidean distance. At block 1508, the selection and distance calculation of blocks 1504 and 1506 are repeated for each available neuron or node.

At block 1510, once all neurons have been processed, the computational processor 540 selects a neuron having a weight vector closest to the input vector. At block 1512, the selected neuron is stored as the best matching unit (BMU). Thus, using the Euclidean distance between vectors, a closest or "best matching" node is determined for the input vector.

At block 1514, a radius is selected by the computational processor 540. The radius can be preset based on context, dynamically determined based on number of neurons, etc., and/or set initially to a certain distance (e.g., a unit distance of 1, etc.) and iterative adjusted based on a number of neurons falling within the radius, etc. At block 1516, the computational processor 540 decays or decreases the radius according to a decay function. For example, the computational processor 540 can apply an exponential decay function to decrease the radius and define a neighborhood around the BMU node.

At block 1518, the adjusted radius is stored by the computational processor 540 as the BMU neighborhood radius. For example, the computational processor 540 can decrease the radius according to block 1516 until the radius reaches a limit (e.g., a minimum number of neurons within the radius, a minimized specified distance, a random radius limit, etc.) and then store the final determined radius as the BMU neighborhood radius. The computational processor 540 determines the radius to define the neighborhood to reduce or minimize intra-class (node) differences while increasing or maximizing inter-class differences when organizing the neurons, for example.

At block 1520, a neuron is selected. For example, the computational processor 540 randomly selects a neuron from the set of available neurons in the SOM. At block 1522, the computational processor 540 compares the neuron to the radius stored with respect to the BMU to determine whether the selected neuron is within the BMU neighborhood radius.

If the node/neuron is within the neighborhood radius, then, at block 1524, the computational processor 540 determines a difference between the input vector weight and the neuron weight (e.g., a Euclidean distance, a link distance, etc.). At block 1526, the determined difference is multiplied by a learning rate. For example, the computational processor 540 applies a monotonically decreasing learning coefficient to the determined distance between the input vector weight and neuron weight. For example, the learning coefficient can decrease as the computational processor 540 learns about the neurons and weights forming the SOM. In some examples, the computational processor 540 may employ an ordering-phase learning rate when in an ordering phase for the plurality of neurons and may employ a tuning-phase learning rate when in a tuning phase for BMU neighborhood analysis. For example, neurons in a 20×20 square grid are trained for 200 iterations with a learning rate of 0.1.

At block 1528, the product of the learning rate multiplication is multiplied by a neighborhood function. For example, the computational processor 540 applies the neighborhood function which gives a distance between the selected neuron and the BMU. In certain examples, processing with the learning rate and neighborhood function converge neuron processing from all neurons on the map to weights differentiating a few neurons in a neighborhood of a BMU. In some examples, the learning rate and the neighborhood function decrease steadily with an increasing processing step index. In other examples, the learning rate and neighborhood function decrease in step-wise fashion over an interval of processing steps. In certain examples, the neighborhood function and/or learning rate can be adaptive using a scaling parameter. In some examples, the neighborhood function can increase or decrease based on a number of neurons captured by the neighborhood function.

At block 1530, a product formed from the neighborhood function is added by the computational processor 540 to the weight of the selected neuron. At block 1532, the computational processor 540 stores the updated weight as the new neuron weight for the selected node.

At block 1534, the computational processor 540 determines whether additional neurons await evaluation for weighting in the neighborhood. If neuron(s) remain, then control returns to block 1520 for selection and processing. At block 1536, if no neurons remain to be processed, then additional input vector(s) are identified. If additional input vector(s) remain to be processed, then control returns to block 1502 for selection and processing of an input vector.

At block 1538, if no input vector remains to be processed, then the computational processor 540 determines correlations between neurons based on the input vectors. For example, the computational processor 540 organizes the neurons to maximize or increase inter-class differences while reducing or minimizing intra-class differences while increasing or maximizing inter-class differences when organizing the neurons to form groups of neurons in the resulting SOM 800, 430-432, for example. For example, weighted nodes can be organized into one or more layers of a resulting SOM 430-432, 800 and used to answer a query posed with respect to the population of the map. In certain examples, the example process of FIG. 15 can be executed in an ordering phase and repeated in a tuning phase until weights stabilize.

Figure 16:
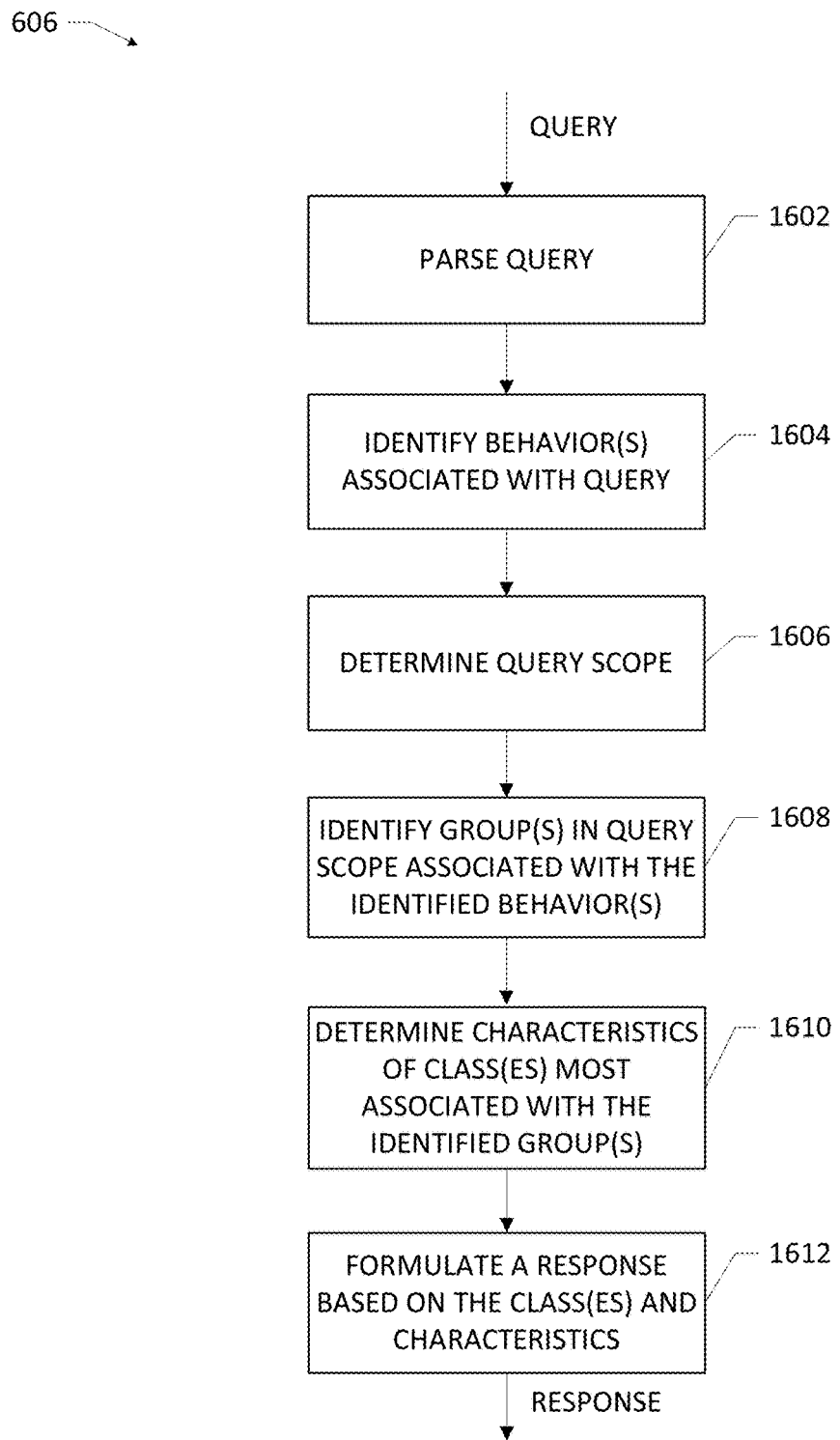
FIG. 16 is a flow diagram representative of example machine readable instructions that may be executed to determine a response to a query.

FIG. 16 is a flow diagram representative of example machine readable instructions that may be executed to determine a response to a query. The example process of FIG. 14 provides additional and/or related detail regarding execution of block 606 of the example process 600 of FIG. 6 to determine a response to a query.

At block 1602, a received query is parsed by the request responder 440. For example, the request responder 440 receives a request from the requester 340 via the input querier 410 and parses the request to identify keywords and/or parameters included in the request. In some examples, the input querier 410 can parse the request and pass keywords, parameters, etc., to the request responder 440 for further processing. For example, a request for what types of households would be interested in a new soap is parsed by the request responder 440 to identify "household", "soap", etc., from the request. Those keywords are used to determine an appropriate response to the question.

At block 1604, the request responder 440 identifies behavior(s) associated with the query. For example, the example query including "household" and "soap" is processed by the request responder 440 to determine that purchasing behavior, household status (e.g., family), cleaning habit, etc., may be relevant behavior for the query. Relationships gleaned from the map(s) 430-432 can be used by the request responder 440 to identify factor(s) relevant to queries such as likelihood of purchasing a certain good or service (e.g., a new soap). In some examples, the input querier 410 can identify behavior(s) instead of or in addition to the request responder 440.

At block 1606, query scope is determined. For example, the request responder 440 and/or input querier 410 evaluates the parsed request to determine its intended scope. For example, the request responder 440 parses the query and identifies that the query was directed to "households". The query may further specify households in the Midwest, households in North America, etc. The identified scope helps to constrain analysis of the query, for example.

At block 1608, one or more groups that are within the query scope and are associated with the identified behavior(s) are identified by the request responder 440. For example, the request responder 440 retrieves information from the SOM(s) 430-432, 800 to answer the question or request posed by the requester 340. For example, certain weighted nodes in a map 430-432 represent a group or cluster of panelists representative of that input category (e.g., low income, high income, several children, no children, large savings, small savings, young, old, employed, unemployed, college-educated, no college education, etc.). In some examples, respondents can be grouped based on answer, respondent characteristic(s), etc. to provide a smaller number of groups or clusters for evaluation. Subsets including a plurality of similar groups can be identified from the SOMs 430-432 to answer a client question.

For example, Groups 1, 3, 5, 10, and 200 out of 400 might be interested in a certain brand of soap, while Groups 300, 302, and 317 are a target audience for a luxury sports car. In certain examples, characteristics from a group of panelists can be extrapolated to a universe of people (e.g., statewide, nationwide, worldwide, etc.) depending upon the scope of the query. The request responder 440 can restrict the scope to respondents in households with families and also take into account associated descriptor(s), characteristic(s), etc., based on the scope and content of the query.

At block 1610, the request responder 440 determines characteristics of the class(es) most associated with the identified group(s). For example, using fuzzy class membership, one or more classes can be matched to the one or more groups of respondents from the map(s) 430-432, 800. The map(s) 430-432, 800 reveal characteristics (e.g., the input categories) associated with each class, as well as identify classes having similar characteristics (e.g.,).

At block 1612, the request responder 440 formulates a response (e.g., the predictive market output 350) based on the class(es) and characteristics. For example, the request responder 440 provides the predictive market output 350 including information such as a description of class(es) best matching the request, characteristics associated with each relevant class, etc. (e.g., one or more classes of people likely to be interested in a product or service in question (e.g., a new soap)). Thus, in contrast to a basic selection of one of 66 segments, respondents can be dynamically distributed into one or more classes (e.g., 400 classes, 100 classes, etc.), and similar or otherwise complimentary classes can be identified from the map(s) 430-432, 800. By clustering respondents in the map(s) 430-432, 800, subsets of respondents can be more easily added together to answer client questions. Additionally, the self-organizing map(s) allow the request responder 440 to identify topologically similar groups that would otherwise be missed by conventional 66 segment methodology, for example.

Figure 17:
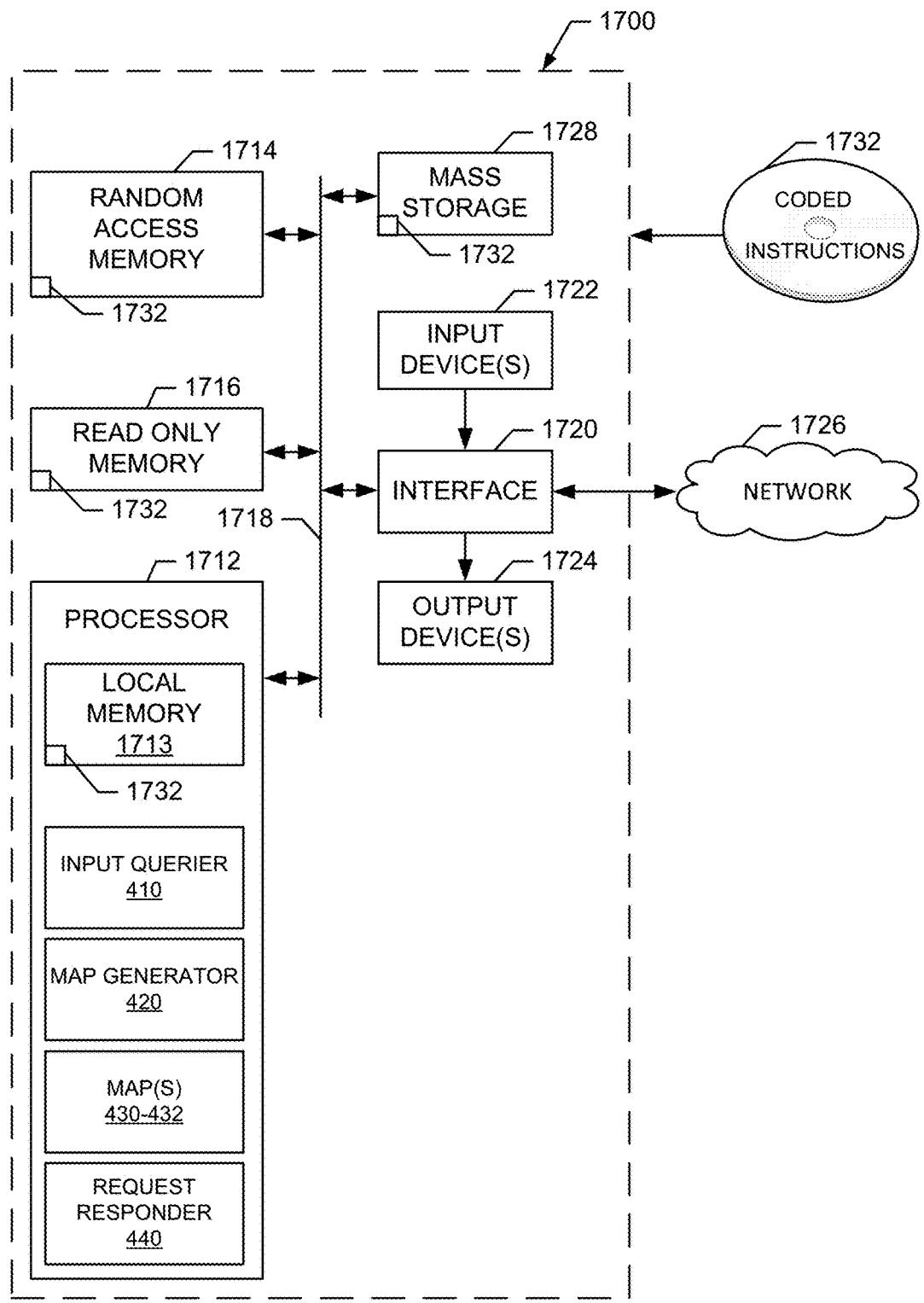
FIG. 17 is a block diagram of an example processor platform capable of executing the instructions of FIGS. 6-7 and 14-16 to implement the example market behavior data mapping and analytics system (and its components) of FIGS. 1 and 3-5.

FIG. 17 is a block diagram of an example processor platform 1700 capable of executing the instructions of FIGS. 6-7 and 14-16 to implement the example market behavior data mapping and analytics system 300 (and its components) of FIGS. 1 and 3-5. The processor platform 1700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer. In the illustrated example, the processor 1712 is structured to include the example input querier 410, the example map generator 420, the example map(s) 430-432, and the example request responder 440 of the example market data processor 330.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

Coded instructions 1732 representing the flow diagrams of FIGS. 8-10 may be stored in the mass storage device 1728, in the volatile memory 1714, in the non-volatile memory 1716, and/or on a removable tangible computer readable storage medium such as a CD or DVD.

From the foregoing, it will be appreciated that examples have been disclosed which allow people (e.g., panelists or respondents) to be dynamically, automatically grouped into classes based on a set of input variables or categories using a self-organizing map. Rather than 66 broad, standard segments, a much finer grain (e.g., 100, 200, 400, etc.) of categorization into classes is achieved by processing people using the SOMs. A finer grain analysis is further facilitated through fuzzy classification of panelists via the SOM, thereby reflecting that a panelist does not always behave according to the characteristics of a single class but, instead, has a primary class and at least some membership in some or all other remaining classes. SOMs can be retrained to classify people differently based on a different and/or otherwise updated set of input variables. Additionally, analysis of the resulting SOMs can identify classes having similar characteristics which can be included in a query response but which would have otherwise been omitted or overlooked in traditional segment analysis.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to facilitate dynamic classification for market research, the method comprising:
    constructing, using a programmed processor based on data for a sample population and a first set of input variables, a self-organizing map classifying the sample population according to a plurality of classes defined in the map using a first fuzzy class membership;
    extracting, using the processor, the first fuzzy class membership for the sample population from the map;
    correlating, using the processor, the first fuzzy class membership with behavior data for the sample population to determine a first likely class behavior for the sample population with respect to the plurality of classes;
    extracting, using the first fuzzy class membership, a second fuzzy class membership for a universe of people from the map;
    predicting a second likely class behavior for the universe of people using the second fuzzy class membership and the first likely class behavior; and
    using the second fuzzy class membership and the second likely class behavior to provide, using the processor in response to a query, a predictive market output including a description of a subset of the plurality of classes identified from the map to answer the query.

2. The method of claim 1, wherein the first fuzzy class membership classifies members of the sample population to be members in each of the plurality of classes.

3. The method of claim 1, wherein the map classifies a member of the sample population with a primary class and a lesser percentage membership in the remaining plurality of classes.

4. The method of claim 1, further including identifying similar classes based on an analysis of class characteristics from the map.

5. The method of claim 1, further including constructing a plurality of self-organizing maps based on a plurality of input vectors.

6. The method of claim 1, wherein the universe of people includes at least one of a population of a state, a population of a region, or a population of a country.

7. The method of claim 1, further including re-constructing, based on data for a sample population and a second set of input variables, the self-organizing map classifying the sample population according to the plurality of classes defined in the map using at least one of the first fuzzy class membership or the second fuzzy class membership.

8. A tangible computer readable storage medium comprising instruction that, when executed, cause a machine to:
    construct, based on data for a sample population and a first set of input variables, a self-organizing map classifying the sample population according to a plurality of classes defined in the map using a first fuzzy class membership;
    extract the first fuzzy class membership for the sample population from the map;
    correlate the first fuzzy class membership with behavior data for the sample population to determine a first likely class behavior for the sample population with respect to the plurality of classes;
    extract, using the first fuzzy class membership, a second fuzzy class membership for a universe of people from the map;
    predict a second likely class behavior for the universe of people using the second fuzzy class membership and the first likely class behavior; and
    use the second fuzzy class membership and the second likely class behavior to provide in response to a query, a predictive market output including a description of a subset of the plurality of classes identified from the map to answer the query.

9. The computer readable storage medium of claim 8, wherein the first fuzzy class membership classifies members of the sample population to be members in each of the plurality of classes.

10. The computer readable storage medium of claim 9, wherein the map classifies a member of the sample population with a primary class and a lesser percentage membership in the remaining plurality of classes.

11. The computer readable storage medium of claim 8, having instructions that, when executed, cause the machine to, identify similar classes based on an analysis of class characteristics from the map.

12. The computer readable storage medium of claim 8, having instructions that, when executed, cause the machine to construct a plurality of self-organizing maps based on a plurality of input vectors.

13. The computer readable storage medium of claim 8, wherein the universe of people includes at least one of a population of a state, a population of a region, or a population of a country.

14. The computer readable storage medium of claim 8, having instructions that, when executed, cause the machine to re-construct, based on data for a sample population and a second set of input variables, the self-organizing map classifying the sample population according to the plurality of classes defined in the map using at least one of the first fuzzy class membership or the second fuzzy class membership.

15. An apparatus comprising:
memory; and
a processor particularly programmed to:
construct, based on data for a sample population and a first set of input variables, a self-organizing map classifying the sample population according to a plurality of classes defined in the map using a first fuzzy class membership;
extract the first fuzzy class membership for the sample population from the map;
correlate the first fuzzy class membership with behavior data for the sample population to determine a first likely class behavior for the plurality of classes;
extract, using the first fuzzy class membership, a second fuzzy class membership for a universe of people from the map;
predict a second likely class behavior for the universe of people using the second fuzzy class membership and the first likely class behavior; and
use the second fuzzy class membership and the second likely class behavior to provide in response to a query, a predictive market output including a description of a subset of the plurality of classes identified from the map to answer the query.

16. The apparatus of claim 15, wherein the first fuzzy class membership classifies members of the sample population to be members in each of the plurality of classes.

17. The apparatus of claim 16, wherein the map classifies a member of the sample population with a primary class and a lesser percentage membership in the remaining plurality of classes.

18. The apparatus of claim 15, wherein the processor is to: identify similar classes based on an analysis of class characteristics from the map.

19. The apparatus of claim 15, wherein the processor is to: construct a plurality of self-organizing maps based on a plurality of input vectors.

20. The apparatus of claim 15, wherein the processor is to: re-construct, based on data for a sample population and a second set of input variables, the self-organizing map classifying the sample population according to the plurality of classes defined in the map using at least one of the first fuzzy class membership or the second fuzzy class membership.

21. A method to cluster data into similar groups for market research, the method comprising:
constructing, based on data for a sample population and a first set of input variables, a self-organizing map classifying the sample population according to a plurality of classes defined in the map using a first fuzzy class membership;
extracting the first fuzzy class membership for the sample population from the map;
correlating the first fuzzy class membership with behavior data for the sample population to determine a first likely class behavior for the plurality of classes; and
extracting, using the first fuzzy class membership, a second fuzzy class membership for a universe of people from the map;
predicting a second likely class behavior for the universe of people using the second fuzzy class membership and the first likely class behavior; and
using the second fuzzy class membership and the second likely class behavior to provide, in response to a query, a predictive market output including a description of a subset of the plurality of classes identified from the map to answer the query.

22. A method comprising:
constructing a self-organizing map classifying respondents according to a first set of input variables defining parameters associated with the respondents, the self-organizing map clustering and distributing the respondents according to a plurality of classes defined in the self-organizing map using a respondent fuzzy class membership;
predicting, based on the respondent fuzzy class membership and respondent behavior data, a respondent class behavior;
extrapolating universe fuzzy class membership based on the respondent fuzzy class membership and the self-organizing map;
predicting a universe class behavior using the universe fuzzy class membership and the respondent class behavior; and
providing an output including at least one of the respondent class behavior or the universe class behavior, associated class characteristic, and class identification, the output to trigger action with respect to a population associated with the output in response to a query.

23. The method of claim 22, wherein the self-organizing map includes a plurality of layers, each layer corresponding to an input variable in the set of input variables.

24. The method of claim 22, wherein predicting a class behavior is triggered by a request for a market behavior prediction.

25. The method of claim 22, further including constructing a second self-organizing map classifying respondents according to a second set of input variables defining parameters associated with the respondents.

* * * * *